US012783810B2

(12) United States Patent
Campos Ortega et al.

(10) Patent No.: US 12,783,810 B2
(45) Date of Patent: Nov. 3, 2026

(54) SYSTEMS AND METHODS OF ARTIFICIALLY INTELLIGENT SENTIMENT ANALYSIS

(71) Applicant: Early Warning Services, LLC, Scottsdale, AZ (US)

(72) Inventors: Edwin F. Campos Ortega, Naperville, IL (US); Eric D. First, Chicago, IL (US); Deepakshi Aswal, Scottsdale, AZ (US); Jie He, Naperville, IL (US); Scott Leighton, Charlotte, NC (US)

(73) Assignee: Early Warning Services, LLC, Scottsdale, AZ (US)

(*) Notice: Subject to any disclaimer, the term of this patent is extended or adjusted under 35 U.S.C. 154(b) by 171 days.

(21) Appl. No.: 18/494,583

(22) Filed: Oct. 25, 2023

(65) Prior Publication Data

US 2024/0135109 A1 Apr. 25, 2024
US 2024/0232538 A9 Jul. 11, 2024

Related U.S. Application Data

(63) Continuation of application No. 15/930,844, filed on May 13, 2020, now Pat. No. 11,842,156.

(51) Int. Cl.
*G06F 40/30* (2020.01)
*G06F 40/289* (2020.01)
*G06F 40/40* (2020.01)
*G06N 20/00* (2019.01)

(52) U.S. Cl.
CPC ............ *G06F 40/30* (2020.01); *G06F 40/289* (2020.01); *G06F 40/40* (2020.01); *G06N 20/00* (2019.01)

(58) Field of Classification Search
CPC ........ G06F 40/30; G06F 40/289; G06F 40/40; G06F 40/103; G06N 20/00
See application file for complete search history.

(56) References Cited

U.S. PATENT DOCUMENTS

| | | | | |
|---|---|---|---|---|
| 9,064,009 | B2 | 6/2015 | Ghosh et al. | |
| 10,546,027 | B1 * | 1/2020 | Parent | G06F 16/90324 |
| 10,684,738 | B1 * | 6/2020 | Sicora | G06F 3/0485 |
| 11,068,758 | B1 | 7/2021 | Liachenko | |
| 11,842,156 | B2 * | 12/2023 | Campos Ortega | G06F 40/103 |
| 2008/0154883 | A1 | 6/2008 | Chowdhury et al. | |

(Continued)

OTHER PUBLICATIONS

Advisory Action issued in U.S. Appl. No. 15/930,844, dated Feb. 24, 2023 in 3 pages.
Advisory Action issued in U.S. Appl. No. 15/930,844, dated Nov. 5, 2021 in 3 pages.
Advisory Action issued in U.S. Appl. No. 15/930,844, dated Jun. 20, 2022 in 4 pages.

(Continued)

*Primary Examiner* — Stella L. Woo

(74) *Attorney, Agent, or Firm* — Kilpatrick Townsend & Stockton LLP

(57) ABSTRACT

A method of providing sentiment analysis includes aggregating, by a processor, a plurality of text-based comments, classifying, by the processor, the plurality of text-based comments as being associated with a polarity of sentiment, and generating, by the processor, a plurality of phrases from the plurality of text-based comments. The method also includes identifying, by the processor, a predetermined number of most common phrases for a particular polarity of sentiment from the plurality of phrases and outputting, by the processor, a graphic that includes the predetermined number of most common phrases for the particular polarity of sentiment.

20 Claims, 12 Drawing Sheets

(56) References Cited

U.S. PATENT DOCUMENTS

| | | | | |
|---|---|---|---|---|
| 2013/0263019 | A1 | 10/2013 | Castellanos et al. | |
| 2014/0039875 | A1 | 2/2014 | Hao et al. | |
| 2015/0019569 | A1 | 1/2015 | Parker et al. | |
| 2015/0347392 | A1* | 12/2015 | Cavalin | G06F 40/30 704/9 |
| 2015/0379090 | A1 | 12/2015 | Gou et al. | |
| 2016/0171542 | A1 | 6/2016 | Fanous et al. | |
| 2017/0140262 | A1 | 5/2017 | Wilson et al. | |
| 2017/0140419 | A1 | 5/2017 | Mannix et al. | |
| 2017/0193397 | A1 | 7/2017 | Kottha et al. | |
| 2017/0278067 | A1 | 9/2017 | Cunico et al. | |
| 2018/0129962 | A1 | 5/2018 | Mathew et al. | |
| 2019/0012381 | A1 | 1/2019 | Debique | |
| 2020/0073485 | A1* | 3/2020 | Al-Halah | G06F 16/5846 |
| 2020/0089767 | A1 | 3/2020 | Ni et al. | |
| 2020/0151220 | A1 | 5/2020 | Cromack et al. | |
| 2020/0151777 | A1* | 5/2020 | Casalino | G06Q 30/0282 |
| 2020/0311114 | A1 | 10/2020 | Sood et al. | |
| 2020/0311203 | A1* | 10/2020 | Zhang | G06F 40/289 |
| 2021/0150546 | A1* | 5/2021 | Zhu | G06Q 30/0282 |
| 2021/0192552 | A1* | 6/2021 | Gugnani | G06Q 30/0282 |
| 2021/0216723 | A1* | 7/2021 | Zhang | G06F 18/214 |

OTHER PUBLICATIONS

Advisory Action issued in U.S. Appl. No. 15/930,844, dated Apr. 21, 2021 in 6 pages.

Final Office Action issued in U.S. Appl. No. 15/930,844, dated Aug. 27, 2021 in 10 pages.

Final Office Action issued in U.S. Appl. No. 15/930,844, dated Feb. 4, 2021 in 10 pages.

Final Office Action issued in U.S. Appl. No. 15/930,844, dated Apr. 13, 2022 in 12 pages.

Final Office Action issued in U.S. Appl. No. 15/930,844, dated Nov. 17, 2022 in 14 pages.

Non-Final Office Action issued in U.S. Appl. No. 15/930,844, dated Dec. 7, 2021 in 11 pages.

Non-Final Office Action issued in U.S. Appl. No. 15/930,844, dated Jul. 21, 2022 in 12 pages.

Non-Final Office Action issued in U.S. Appl. No. 15/930,844, dated Mar. 28, 2023 in 15 pages.

Non-Final Office Action issued in U.S. Appl. No. 15/930,844, dated May 20, 2021 in 9 pages.

Non-Final Office Action issued in U.S. Appl. No. 15/930,844, dated Oct. 29, 2020 in 9 pages.

Notice of Allowance issued in U.S. Appl. No. 15/930,844, dated Aug. 3, 2023 in 5 pages.

* cited by examiner

FIG. 7
AGGREGATE A NUMBER OF COMMENTS 702
CLASSIFY EACH COMMENT AS BEING POSITIVE OR NEGATIVE 704
BREAK DOWN COMMENTS INTO INDIVIDUAL TERMS 706
PERFORM ADDITIONAL PROCESSING MEASURES ON TERMS 708
LEMMATIZE REMAINING TERMS 710
IDENTIFY MOST IMPORTANT TERMS TO THE SENTIMENT 712
OUTPUT A VECTOR OF WEIGHTS FOR EACH COMMENT 714
TRAIN A SENTIMENT CLASSIFICATION MODEL USING THE OUTPUT VECTORS 716
700

SYSTEMS AND METHODS OF ARTIFICIALLY INTELLIGENT SENTIMENT ANALYSIS

CROSS REFERENCE TO RELATED APPLICATIONS

This application is a continuation of U.S. Non-Provisional patent application Ser. No. 15/930,844, filed on May 13, 2020, which is incorporated by reference for all purposes.

BACKGROUND OF THE INVENTION

There is a vast and rich collection of public opinion data available in online product reviews, blog posts, and social media outlets. Common practices to recognize brand public opinion are based on humans reading online articles, survey, or reviews to discern positive or negative sentiment from the text. Such tasks may take from minutes to days to complete, depending on the amount of text. As a result, there have been efforts made to provide computerized sentiment analysis tools. However, conventional sentiment analysis techniques are performed using are performed using local computers and require an instance of sentiment analysis software to be present on each computer that is performing the sentiment analysis.

BRIEF SUMMARY OF THE INVENTION

Embodiments of the present invention provide systems and methods for quickly and effectively analyzing the sentiment of vast collections of data, such as online product reviews, blog posts, and social media posts. The data may be processed and classified based on content and/or a sentiment associated with the data. Common phrases and/or topics may be identified from the data and graphical outputs may be produced that provide indications of how common various topics and/or phrases are within the collection of data. These systems and methods provide visual representations that provide quick feedback to users about the content of the data, which may include thousands or tens of thousands of reviews.

In one embodiment, a method of providing sentiment analysis is provided. The method may include aggregating a plurality of text-based comments and classifying the plurality of text-based comments as being associated with a polarity of sentiment. The method may also include generating a plurality of phrases from the plurality of text-based comments and identifying a predetermined number of most common phrases for a particular polarity of sentiment from the plurality of phrases. The method may further include outputting a graphic that includes the predetermined number of most common phrases for the particular polarity of sentiment.

In some embodiments, generating the plurality of phrases may include removing one or more of single-letter words, two-letter words, words on a pre-defined list, punctuation, or numbers from each of the plurality of comments to form sets of remaining words for each of the plurality of comments and lemmatizing the sets of remaining words for each of the plurality of comments to generate the plurality of phrases. In some embodiments, generating the plurality of phrases may include lemmatizing words for each of the plurality of comments and converting at least some of the lemmatized words into tri-grams to generate the plurality of phrases.

In some embodiments, the method may also include removing text-based comments that are associated with a neutral score prior to generating the plurality of phrases. In some embodiments, the method may further include translating at least one of the plurality of the text-based comments into a different language prior to generating the plurality of phrases. In some embodiments, aggregating the plurality of text-based comments may include retrieving the plurality of text-based comments from an external database. In some embodiments, aggregating the plurality of text-based comments may include downloading a number of social media comments that include a particular data tag.

In another embodiment, a computing system for providing sentiment analysis is provided. The computing system may include a processor and a memory having instructions stored thereon. When executed by the processor, the instructions cause the processor to aggregate a plurality of text-based comments, classify the plurality of text-based comments as being associated with a polarity of sentiment, and generate a plurality of phrases from the plurality of text-based comments. The instructions further cause the processor to identify a predetermined number of most common phrases for a particular polarity of sentiment from the plurality of phrases and output a graphic that includes the predetermined number of most common phrases for the particular polarity of sentiment.

In some embodiments, the computer system may include a network interface. Aggregating the plurality of text-based comments may include retrieving the plurality of text-based comments from an external database. Aggregating the plurality of text-based comments may include downloading a number of social media comments that include a particular data tag. In some embodiments, the particular data tag may include a hash tag. In some embodiments, generating the plurality of phrases may include removing one or more of single-letter words, two-letter words, words on a pre-defined list, punctuation, or numbers from each of the plurality of comments to form sets of remaining words for each of the plurality of comments and lemmatizing the sets of remaining words for each of the plurality of comments to generate the plurality of phrases.

In some embodiments, the plurality of text-based comments may be classified based on a score associated with each of the plurality of text-based comments. The score may be indicative of the polarity of sentiment associated with each of the plurality of text-based comments. In some embodiments, the instructions further cause the processor to group the plurality of phrases in to topic groups prior to identifying the predetermined number of most common phrases. The graphic may include the predetermined number of most common phrases arranged based on topic groups. A display size of each of the topic groups may be based on a respective number of the predetermined number of most common phrases falling into each respective topic group.

In another embodiment, a non-transitory computer-readable medium having instructions stored thereon is provided. The instructions, when executed, cause a computing device to aggregate a plurality of text-based comments, classify the plurality of text-based comments as being associated with a polarity of sentiment, and generate a plurality of phrases from the plurality of text-based comments. The instructions further cause the computing device to identify a predetermined number of most common phrases for a particular polarity of sentiment from the plurality of phrases and output a graphic that includes the predetermined number of most common phrases for the particular polarity of sentiment.

In some embodiments, a display size of each of the most common phrases within the graphic may be determined based on a number of instances of each one of the most common phrases within the plurality of text-based comments. In some embodiments, an orientation of each of the most common phrases within the graphic may be determined based at least in part on one or more of a shape of the graphic or a location of a particular one of the most common phrases within the graphic. In some embodiments, one or both of a size or a shape of the graphic may be determined based on the polarity of the sentiment associated with the most common phrases within the graphic. In some embodiments, the instructions further cause the processor to group the plurality of phrases in to topic groups prior to identifying the predetermined number of most common phrases. The graphic may include the predetermined number of most common phrases arranged based on topic groups. A display size of each of the topic groups may be based on a respective number of the predetermined number of most common phrases falling into each respective topic group. In some embodiments, the graphic may further include an indication of a relative number of the plurality of phrases that fall within the predetermined number of most common phrases.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a set of parentheses containing a second label that distinguishes among the similar components. If only the first reference label is used in the specification, the description is applicable to any one of the similar components having the same first reference label irrespective of the second reference label.

DETAILED DESCRIPTION OF THE INVENTION

The ensuing description provides embodiment(s) only, and is not intended to limit the scope, applicability or configuration of the disclosure. Rather, the ensuing description of the embodiment(s) will provide those skilled in the art with an enabling description for implementing an embodiment. It is understood that various changes may be made in the function and arrangement of elements without departing from the spirit and scope of this disclosure.

Embodiments of the present invention provide system s and methods for providing sentiment analysis for large collections of feedback data. For example, embodiments may ingest large amounts of data (online product reviews, blog posts, social media posts, etc.), which may be rapidly preprocessed and classified based on a sentiment and/or topic associated with each piece of data. In some embodiments, a computer data object may be output that includes at least a portion of the data being grouped by sentiment and/or a cluster of discussion associated with the various data. In some embodiments, graphical outputs be generated that provide visual indications of how frequent sentiments and/or topics of feedback occur within the data. In some embodiments, additional metrics, such as statistical data, may also be output to allow for quick and accurate analysis of datasets of vast sizes, without the need for a human to review the individual pieces of data themselves.

In some embodiments, the systems and methods described herein may be cloud-based, which may allow such analysis to be performed and graphical outputs to be generated by any user with network access to the server on which the analysis tool is hosted. This opens up access to batch-review sentiment analysis to any number of users spaced around the globe, without the users needing to have individual instances of the software downloaded and installed to their respective computing devices. Additionally, by being cloud-based, the system may allow users to access the sentiment and/or topic analysis tools even when using computing devices that do not have sufficient processing power to properly and/or efficiently perform the necessary analysis on such large collections of data. While largely discussed in terms of comments and/or other product/service reviews, it will be appreciated that the techniques described herein may be utilized in other applications.

Figure 1:
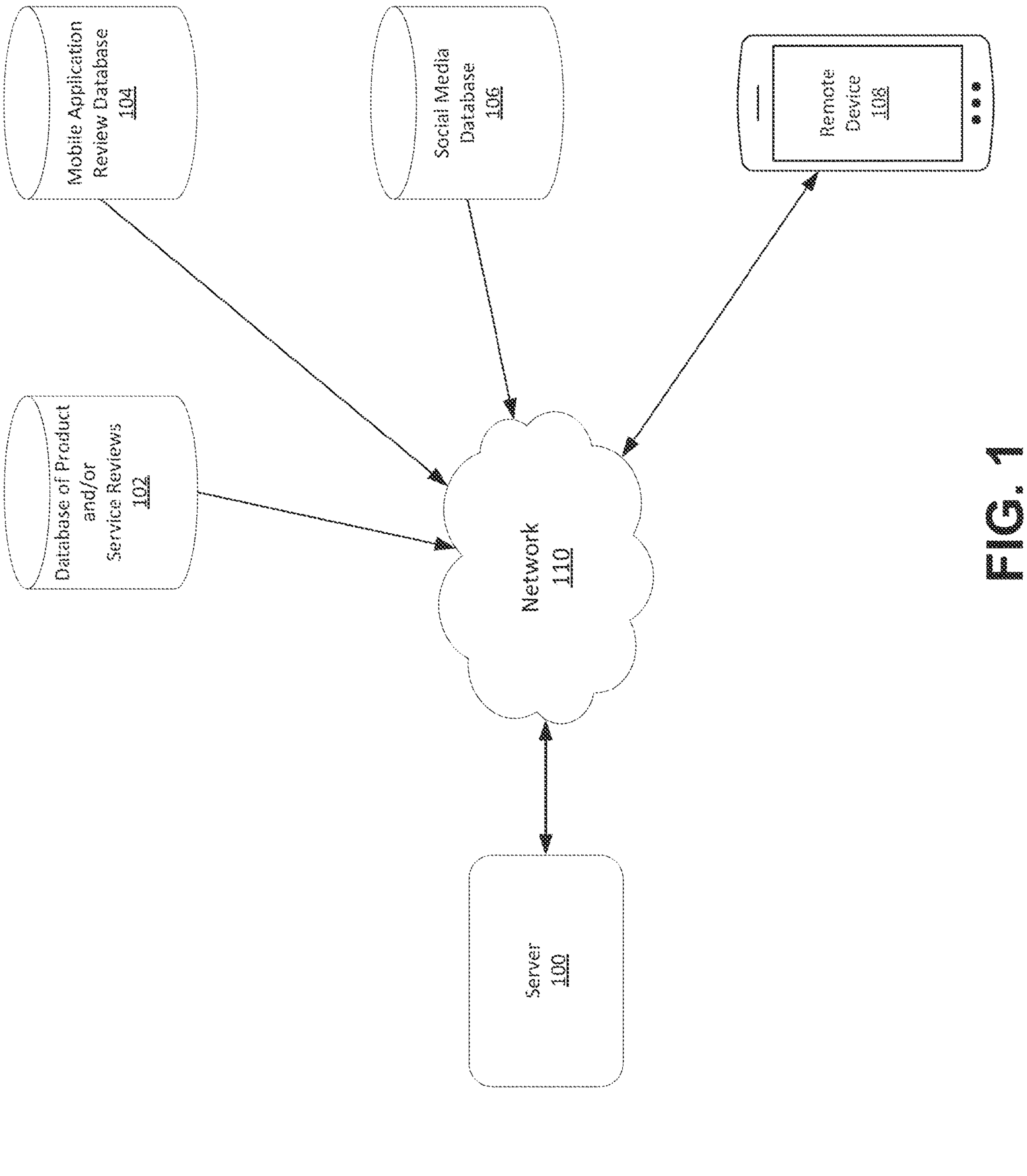
FIG. 1 is a system diagram of a system for providing sentiment analysis according to embodiments.

Turning now to FIG. 1, a system diagram of a system for performing sentiment and/or topic analysis is illustrated. The system may include a computing device, such as a server 100. Server 100 may be configured to perform analysis on batches of data from one or more sources. For example, the server 100 may be in communication with one or more databases of product and/or service reviews 102. In some embodiments, the database of product and/or service reviews 102 may include only reviews or comments associated with a single product and/or brand. If multiple products and/or services are represented, each product and/or service may include a data tag and/or other identifier that allows the comment (which may include comments, reviews, and/or other text and/or characters associated with a particular topic) to be associated with a particular product or service within the database of product and/or service reviews 102. In some embodiments, the database of product and/or service reviews 102 may be associated with an entity that operates server 100. In other embodiments, the database of product and/or service reviews 102 may be operated by an independent entity, such as a merchant and/or review entity. In such embodiments, the comments in the database of product and/or service reviews 102 may be associated with a number of products, services, and/or brands. As just one example, a large retail merchant may provide a large number of products and services for sale. Customers of the retail merchant may leave comments related to products and/or services they have purchased and/or otherwise utilized. In such instances, each review may include a data tag and/or other identifier that allows the comment to be associated with a particular product, service, and/or brand within the database of product and/or service reviews 102.

In some embodiments, the server 100 may be analyzing review and/or comment data associated with a mobile application and/or other software package. In such embodiments, the server 100 may also be in communication with one or more mobile application review databases 104, such as a review database from a mobile application store or other download source. The comments on mobile application review database 104 may be associated with a particular mobile application, other software package, brand, and/or software developer, and may include a data tag or other identifier that identifies the particular mobile application, other software package, brand, and/or software developer associated with a particular comment.

In some embodiments, the server 100 may be used to analyze reviews made on other platforms, such as social media sites and/or mobile applications. In such embodiments, the server 100 may be in communication with one or more social media sites and/or databases 106. Social media database 106 may include a number of social media posts and discussions on any number of topics. Oftentimes, the posts may include data tags, such as hashtags, that may provide an indication of the content of the post. These data tags may be used by the server 100 to identify social media posts that are relevant to a particular product, service, and/or brand and may be used by the server 100 to aggregate the relevant posts for analysis. For example, the server 100 may submit an application programming interface (API) call to the social media database 106 requesting all posts having data tags that match one or more data tags associated with the request, which may be relevant to a particular product, service, and/or brand. In some embodiments, such a request may also include a date range that specifies that only posts made within that date range should be retrieved.

The server 100 may take in data from one or more of these sources (database of product and/or service reviews 102, mobile application review database 104, and/or social media database 106) for analysis of the sentiment and/or content of the various comments and/or review. This analysis, which will be described in greater detail below, often includes classifying the comments as being associated with a positive or negative sentiment, generating a number of phrases from comments, and identifying most common phrases from the collected comments. Oftentimes, the server 100 will then generate an output that includes at least one graphic that provides quick and readily understandable feedback associated with the batch of comments analyzed (which may range from a handful of comments to hundreds of thousands or more comments).

In some embodiments, the server 100 may be connected to one or more remote 108 devices that may be used to display the outputs. Remote devices 108 may include personal computers, tablet computers, e-readers, mobile phones, and/or other network-capable communications devices. In some embodiments, one or more remote devices 108 may be configured to receive the outputs, such as via a pushed data package, an email, short message service (SMS) message, and/or other message format. In other embodiments, the remote devices 108 may submit a request for the analysis to be performed. The request may specify a product, brand, and/or service whose comments are to be analyzed. In some embodiments, the request may also specify a desired date range for the comments (such as the date on which the comment was posted) and/or one or more social media data tags to use for retrieving the comments. In some embodiments, the remote devices 108 may communicate with the server 100 via a frontend website. The frontend website may allow a user to input any analysis criteria (product/service/brand, data tags, date ranges, etc.) and submit a request to the server 100 to perform analysis on any results (which may come from one or more of the sources described herein). The results of the analysis, such as graphical outputs, may be displayed by the frontend website for viewing by a user of the remote device 108.

The server 100 may be in communication with the various data sources and remote devices 108 via one or more networks 110, such as the Internet. For example, network 108 may include one or more local area networks (LAN) and/or other wired and/or wireless networks. Network 108 may utilize one or more of Wi-Fi, ZigBee, Bluetooth™, Bluetooth™ Low Energy, a cellular communications protocol such as 3G, 4G, or LTE, and/or any other wireless communications protocol. It will be appreciated that one or more different network connections may be used in accordance with the invention, and that the use of a single network 110 to enable communications is merely one example of such configurations. In some embodiments, the connections may be secure. This may be done using encryption over a public network, a private network, a secure virtual private network (VPN), or any other method of securing a connection.

It will be appreciated that while largely discussed in terms of a cloud-based analytics solution with processing being performed on server 100, in some embodiments the processing may be performed on a local computer. In such embodiments, the local computing device may have an instance of an analytics model downloaded and installed into a memory device of the local computing device. The local computing device may then perform analytics in similar manner on comments from one or more data sources. Any outputs of the analysis may then be output on a display device of the local computing device and/or sent to one or more remote computing devices, such as remote devices 108.

Figure 2:
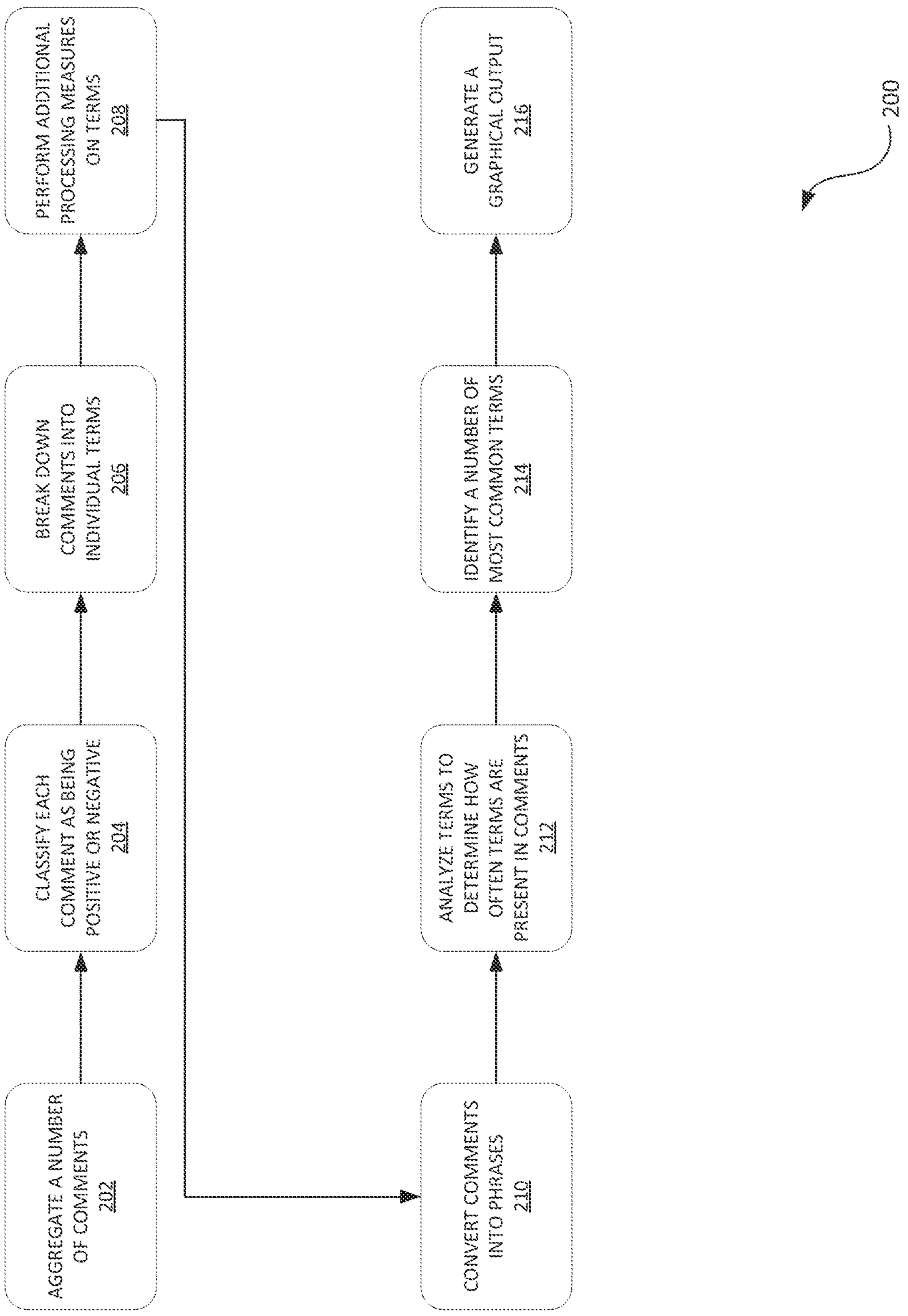
FIG. 2 is a flowchart for a process for generating graphics that represent how relevant or common a particular term or phrase is within a batch of comments according to embodiments.

FIG. 2 is a flowchart illustrating a process 200 for generating graphics that represent how relevant or common a particular term or phrase is within a batch of comments. The process 200 may be performed by a server, such as server 100 described above. In some embodiments, the server may perform process 200 in response to a request received from one or more remote devices, such as remote devices 108. Process 200 may begin at block 202 by aggregating a number of text-based comments. These comments may be retrieved from one or more sources, such as a database of product and/or service reviews, mobile application review database, and/or social media database such as those described above. The comments may be retrieved based on a number of criteria, which may be specified in a query or request for the comments from one or more sources. For example, a query sent to one or more sources may specify that the retrieved comments pertain to one or more products, services, and/or brands, match one or more data tags, fall into a particular date range, come from one or more sources, and/or other criteria.

Once, the comments have been retrieved, the comments and/or review may be classified as being associated with a positive sentiment or a negative sentiment (or possibly neutral) at block 204. This classification may be based on a score associated with each comment or review. For example, formal reviews on websites and the like are often associated with a score rating, such as a score from 0 or 1 to 3, 5, 10, etc. These scores or ratings may be provided to the server along with the comments. If such scores are provided, the server may classify each comment as having a positive or negative (or neutral) sentiment based on its associated scored. As just one example, on a scale from 1 to 5, scores of 1 or 2 may be negative, scores of 4 or 5 may be positive, and scores of 3 may be neutral, although it will be appreciated that other scoring techniques may be utilized, including those in which no neutral ratings are provided (which may result, for example, in a score of 3 being classified as either positive or negative). In some embodiments, such as where social media posts and/or non-text-based comments are used, and/or other scenarios in which no formal ratings or score have been assigned to a particular comment, the comments may be classified using a machine learning model that has been trained to recognize the sentiment of a particular comment. A training process and process to utilize a machine learning program to analyze the sentiment are discussed in greater detail with respect to FIGS. 7 and 8 below.

Once the comments have been classified as being positive or negative (or possibly neutral), the various comments may be broken down into individual words, such as by word tokenizing the comments, at block 206. This may be done for all comments or only for comments having a particular polarity of sentiment (i.e. positive or negative). In some embodiments, once the comments are broken up into individual words various processing may be performed to make the comments more uniform, one or more additional processing measures may be performed at block 208. For example, any punctuation may be removed, numbers may be removed or converted into text where appropriate (i.e. converting "2" into "to", "two", or "too" when the context of a comment suggests a user inputted the number to represent a letter and/or word), removing single-letter and/or two-letter words, expanding abbreviations into the full word(s), converting all letters into a single case (i.e. all uppercase or all lowercase), and/or other processing to make the format of each of the comments more uniform. In some embodiments, before and/or during the processing steps described above, some or all of the comments (or a portion of one or more comments) may need to be translated from one language to another. A machine translation engine may be utilized to detect the language of the comments and automatically translate the text within the comments into a desired language. In other embodiments, if a comment is in a language that is not desired (such as if the backend service model has not been programmed to handle the particular language), such comments may be discarded rather than translated.

At block 210, once the comments have been processed, the comments may be converted into phrases, such as trigrams (three terms), bigrams (two terms), and unigrams (one term), although phrases having any number of terms may be generated in some embodiments. The phrases may then be analyzed to determine how often each phrase is found in the analyzed comments at block 212. For example, in some embodiments the various phrases may be count-vectorized to generate a frequency of each phrase. At block 214, a predetermined number (such as 5, 10, 25, 50, etc.) of most commonly occurring phrases may be identified and selected for output. A graphical output may be generated at block 216. The graphical output may include a display of the predetermined number of most commonly occurring phrases within the batch of comments. The graphical output may be presented on a display device and/or transmitted over a network to one or more remote devices (such as remote devices 108) for subsequent viewing.

Figure 3:
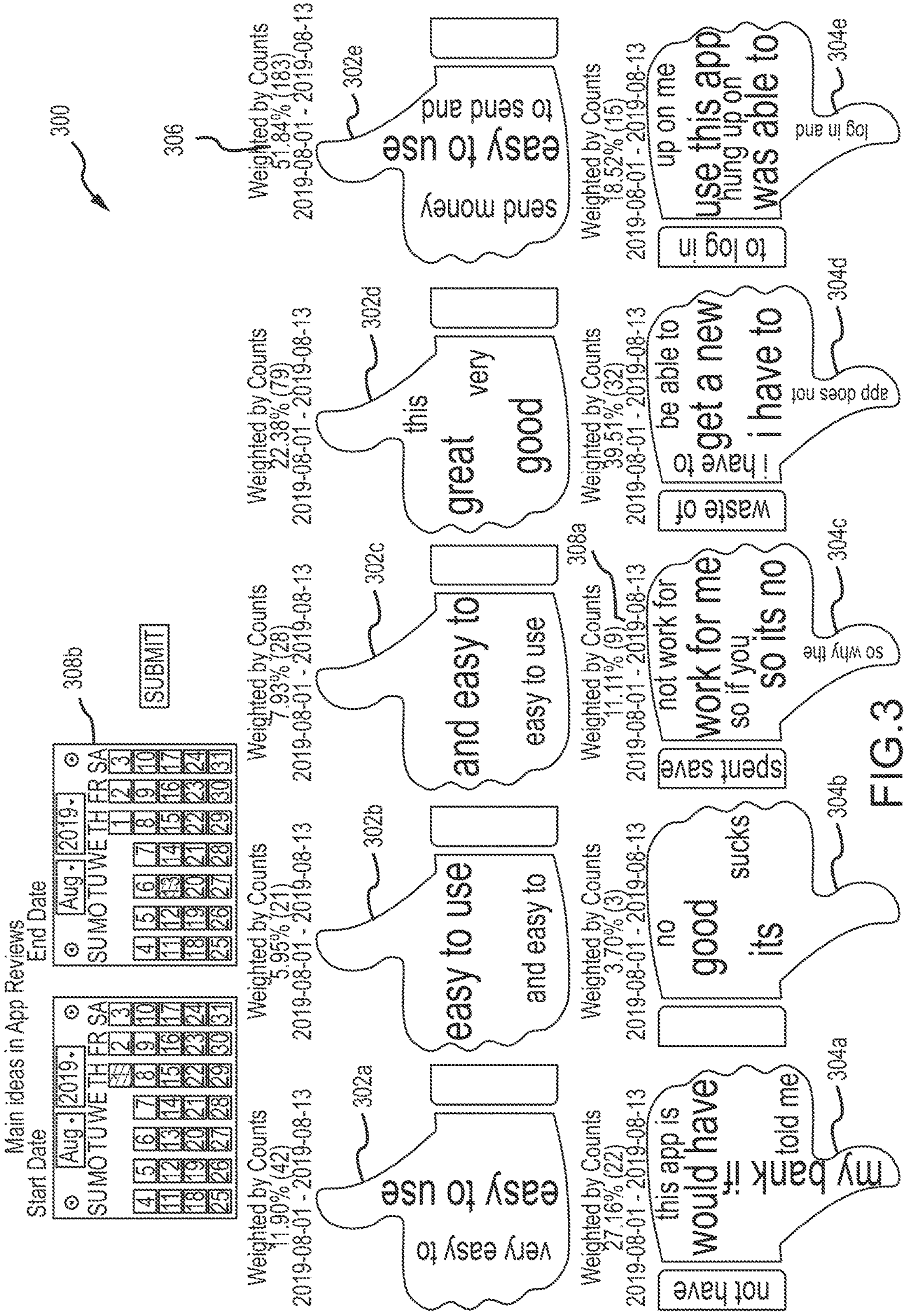
FIG. 3 illustrates a graphical output according to embodiments.

FIG. 3 illustrates one embodiment of a graphical output 300 that may be generated via process 200. As illustrated, graphical output 300 includes a number of thumbs-up graphics 302 and thumbs-down graphics 304 which provide an indication of the polarity of the sentiment of the comments displayed therein. While illustrated with five of each of thumbs-up graphics 302 and thumbs-down graphics 304, it will be appreciated that graphical output 300 may include any number of thumbs-up graphics 302 and/or thumbs-down graphics 304. Additionally, rather than having thumb-based graphics, other shapes and/or types of graphics may be utilized. It may be preferable, however, to utilize a graphic whose color, shape, and/or other features connote a particular polarity of sentiment.

Within each of the thumbs-up graphics 302 and thumbs-down graphics 304, a subset of the most commonly occurring phrases are displayed. Oftentimes, each graphic includes phrases of only a certain number of terms (e.g., only trigrams or only bigrams, etc.). Thus, in some embodiments, the graphical output 300 may include separate thumbs-up graphics 302 and/or thumbs-down graphics 304 for phrases of different sizes. Additionally, in some embodiments, the graphical output 300 may include thumbs-up graphics 302 and/or thumbs-down graphics 304 that represent a different number of most commonly occurring phrases. As just one example, one of the thumbs-up graphics 302 and/or thumbs-down graphics 304 may contain the 50 most commonly occurring phrases while another thumbs-up graphics 302 and/or thumbs-down graphics 304 may contain the 25 most commonly occurring phrases.

In some embodiments, each phrase may be displayed in a uniform manner within the graphics. However, oftentimes, the graphics may be sized, colored, and/or positioned based on how common the particular phrase occurs within the analyzed batch of comments. For example, phrases that are most common may be displayed with larger sizes of text, with more striking colors, and/or in more prominent positions within the graphics. Additionally, in some embodiments, some of the phrases may be displayed in a vertical and/or angled orientation, rather than in conventional horizontal orientation. Such displays allows a substantial portion of the graphics to be filled with phrases, even when the graphics are non-rectangular shapes (such as thumb-based shapes).

In some embodiments, the graphical output 300 may also include one or more metrics associated with the most commonly occurring phrases. For example, the graphical output 300 may include a numerical representation of how often a particular phrase and/or group of phrases showed up within the batch of comments. As one particular example, a percentage 306 of comments containing a particular phrase and/or group of phrases in a particular thumbs-up graphics 302 and/or thumbs-down graphics 304 may be displayed. In other embodiments, a date range 308 (oftentimes including a start date and an end date) from which the comments were collected may be displayed. The date range 308 may be represented textually, such as for date range 308*a* and/or graphically, such as for date range 308*b* in which the date ranges are reflected using a calendar icon. It will be appreciated that in some embodiments, the date range 308 may not be continuous, as the request may specify multiple dates and/or ranges that may be separated by one or more days. Additionally, in some embodiments, the data range 308 may consist only of a single date. It will be appreciated that other metrics and/or statistics may be include on the graphical output 300 in some embodiments.

In some embodiments, the graphical output 300 may include one or more interactive features. For example, if a user viewing the graphical output 300 hovers a mouse icon, clicks on, and/or otherwise interacts with a particular graphic, such as thumbs-up graphics 302 and/or thumbs-down graphics 304, additional data may be displayed and/or a new page may be loaded. In some embodiments, if a user interacts with thumbs-up graphics 302 and/or thumbs-down graphics 304 an ordered ranking of the frequency of the various terms displayed in the graphic may be displayed in list format. In other embodiments, if a user interacts with a particular phrase within a graphic, statistics related to that particular phrase may be displayed. In some embodiments, the user may be able to interact with a particular phrase to retrieve and/or display one or more of the original comments that contained the relevant phrase. This allows a user to identify common issues and/or types of praise associated with a particular product, service, and/or brand and pull up the original comments to get further context for the phrases, which may allow the user to make more informed decisions on whether and how to tweak the associated product, service, and/or brand.

Figure 4:
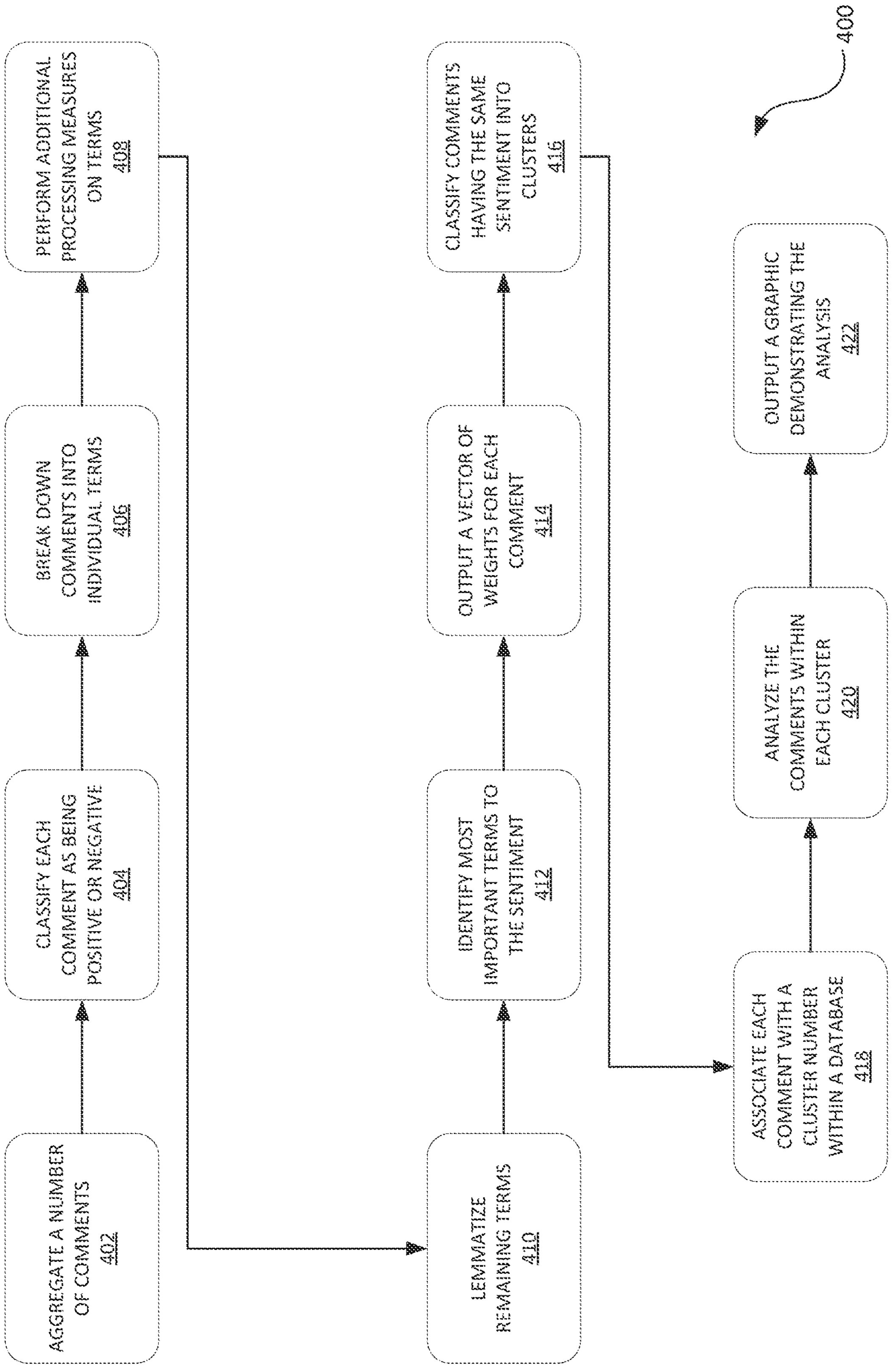
FIG. 4 is a flowchart for a process for generating graphics that include comments from a large batch grouped by sentiment and topics of discussion according to embodiments.

FIG. 4 is a flowchart illustrating a process 400 for generating graphics that include comments from a large batch grouped by sentiment and topics of discussion. The process 400 may be performed by a server, such as server 100 described above. In some embodiments, the server may perform process 400 in response to a request received from one or more remote devices, such as remote devices 108. Process 400 may begin at block 402 by aggregating a number of text-based comments. These comments may be retrieved from one or more sources, such as a database of product and/or service reviews, mobile application review database, and/or social media database such as those described above. The comments may be retrieved based on a number of criteria, which may be specified in a query or request for the comments from one or more sources. For example, a query sent to one or more sources may specify that the retrieved comments pertain to one or more products, services, and/or brands, match one or more data tags, fall into a particular date range, come from one or more sources, and/or other criteria.

Once, the comments have been retrieved, the comments and/or review may be classified as being associated with a positive sentiment or a negative sentiment (or possibly neutral) at block 404. This classification may be based on a score associated with each comment or review. For example, formal reviews on websites and the like are often associated with a score rating, such as a score from 0 or 1 to 3, 5, 10, etc. These scores or ratings may be provided to the server along with the comments. If such scores are provided, the server may classify each comment as having a positive or negative (or neutral) sentiment based on its associated scored. As just one example, on a scale from 1 to 5, scores of 1 or 2 may be negative, scores of 4 or 5 may be positive, and scores of 3 may be neutral, although it will be appreciated that other scoring techniques may be utilized, including those in which no neutral ratings are provided (which may result, for example, in a score of 3 being classified as either positive or negative). In some embodiments, such as where social media posts and/or non-text-based comments are used, and/or other scenarios in which no formal ratings or score have been assigned to a particular comment, the comments may be classified using a machine learning model that has been trained to recognize the sentiment of a particular comment. A training process and process to utilize a machine learning program to analyze the sentiment are discussed in greater detail with respect to FIGS. 7 and 8 below.

Once the comments have been classified as being positive or negative (or possibly neutral), the various comments may be broken down into individual words, such as by word tokenizing the comments, at block 406. In some embodiments, once the comments are broken up into individual words various processing may be performed to make the comments more uniform, one or more additional processing measures may be performed at block 408. For example, any punctuation may be removed, numbers may be removed or converted into text where appropriate (i.e. converting "2" into "to", "two", or "too" when the context of a comment suggests a user inputted the number to represent a letter and/or word), removing single-letter and/or two-letter words, expanding abbreviations into the full word(s), converting all letters into a single case (i.e. all uppercase or all lowercase), and/or other processing to make the format of each of the comments more uniform. In some embodiments, words that have been deemed irrelevant to the determination of sentiment may be removed, such as by checking the words within the comments against a list (such as a Stop Words list) and removing any words that match those on the list. In some embodiments, before and/or during the processing steps described above, some or all of the comments (or a portion of one or more comments) may need to be translated from one language to another. A machine translation engine may be utilized to detect the language of the comment and automatically translate the text within the comment into a desired language. In other embodiments, if a comment is in a language that is not desired (such as if the backend service model has not been programmed to handle the particular language), such comments may be discarded rather than translated. In some embodiments, the comments may also be converted into phrases, such as trigrams (three terms), bigrams (two terms), and unigrams (one term), although phrases having any number of terms may be generated in some embodiments. The phrases may be analyzed to determine how often each phrase is found in the analyzed comments.

At block 410, once the comments and words have gone through any processing, the remaining words and/or phrases may be stemmed or lemmatized, such as by using a part of speech of the words, to group together the inflected forms of a word so they can be analyzed as a single term. Stemming is the process of reducing inflected (or sometimes derived) words to their respective word stem, base or root form, while lemmatization is the algorithmic process of determining the lemma of a word based on its intended meaning. Unlike stemming, lemmatization depends on correctly identifying the intended part of speech and meaning of a word in a sentence and/or larger passage of text. This grouping may help with the sentiment analysis, by ensuring that words of similar meaning are analyzed the same. At this point, the grouped words, polarity of sentiment of the original comments (and by extension, the words derived from the comments), and the original text of the comments may be associated with one another in a database, such as a Python Pandas Dataframe. The database may then be analyzed to identify the most "important" terms at block 412. For example, the terms may be vectorized (converted into numbers) and/or a term frequency inverse document frequency calculation (TF-IDF) may be performed on the database. TF-IDF enables each term to be associated with a number that represents how relevant each word is in a particular comment. Comments with similar, relevant terms will have similar vectors. TF-IDF works by increasing proportionally to the number of times a word appears in a document, but is offset by the number of comment that contain the word. So, words that are common in every comment may rank low even though they may appear many times, since they don't mean much to a particular comment However, if a particular term appears many times in a particular comment, while not appearing many times in others, it probably means that the term very relevant. TF-IDF for a term in a comment is calculated by multiplying two different metrics—the "term frequency" of a term in a comment and the "inverse document frequency" of the term across a set of comments There are several ways of calculating the term frequency, with the simplest being a raw count of instances a word appears in a comment In some embodiments, the frequency of the term may be adjusted by length of a document and/or by the raw frequency of the most frequent term in a particular comment The inverse document frequency indicates how common or rare a term is in the entire comment set. The closer the inverse document frequency is to 0, the more common a word is. This metric can be calculated by taking the total number of comments, dividing the total number by the number of comments that contain a particular term, and calculating the logarithm. So, if the term is very common and appears in many comments, this number will approach 0, otherwise, it will approach 1. Multiplying these two numbers results in the TF-IDF score of a term in a comment The higher the score, the more relevant that word is in that particular comment After the importance of the various terms has been determined, a vector of lemmas (or other terms) and TF-IDF (or similar) weights for each comment is output and associated with a sentiment of the comment at block 414.

At this point, comments having the same sentiment (i.e. positive or negative) may be classified into a predefined number of clusters at block 416. For example, in some embodiments the comments may be clustered using a K-means clustering algorithm, which finds groups in the data, with the number of groups represented by the variable K. The K-means clustering algorithm works iteratively to assign each comment to one of a pre-determined number of groups based on the content of each comment (e.g. the phrases found within each comment) that is provided. The comments and/or review are clustered based on a similarity of the topics discussed within each comment. For example, a first cluster may include comments related to the ease of use of a product, a second cluster may include comments related to customer service, a third cluster may include comments related to quality of a product, a fourth cluster may include comments related to technical issues, etc. Thus, each cluster number will correspond to a particular driver of sentiment as the topics of the comments and/or phrases have already been classified based on a polarity of sentiment. Rather than defining groups before looking at the data, clustering allows you to find and analyze the groups that have formed organically.

While discussed primarily with regard to clustering using a K-clustering algorithm, it will be appreciated that any number of clustering algorithms may be utilized such as, but not limited to, DBScan, spectral clustering, and modeling with Gaussian mixtures. In some embodiments, a dimensionality reduction technique, such as principal component analysis, can be used to separate groups of patterns in data.

After and/or during clustering the comments, a centroid position of each cluster may be stored, and may be expressed in multidimensional space of the most informative lemmas as determined above. Each centroid of a cluster is a collection of feature values which define the resulting groups. For example, each data point (comment and/r review) may be assigned to its nearest centroid, based on the squared Euclidean distance. Examining the centroid feature weights can be used to qualitatively interpret what basic topic each cluster represents. At block 418 each comment may be associated with its relevant cluster number within the database (such as the Python Pandas Dataframe).

At block 420, the reviews and/or comments within each cluster may be analyzed and reported. For example, the server may determine the most commonly occurring comments within each cluster, the most frequent trigrams (or other size of phrases) within each cluster (for embodiments in which phrases are generated for a particular number of terms), a predetermined number of comments that are closest to the centroid of each cluster (in other words, the reviews that are most closely related to the topic of the cluster). Other metrics may also be generated. Once generated, one or more graphics demonstrating the analysis of the comments may be generated at block 422. The graphical output may be presented on a display device and/or transmitted over a network to one or more remote devices (such as remote devices 108) for subsequent viewing.

Figure 5:
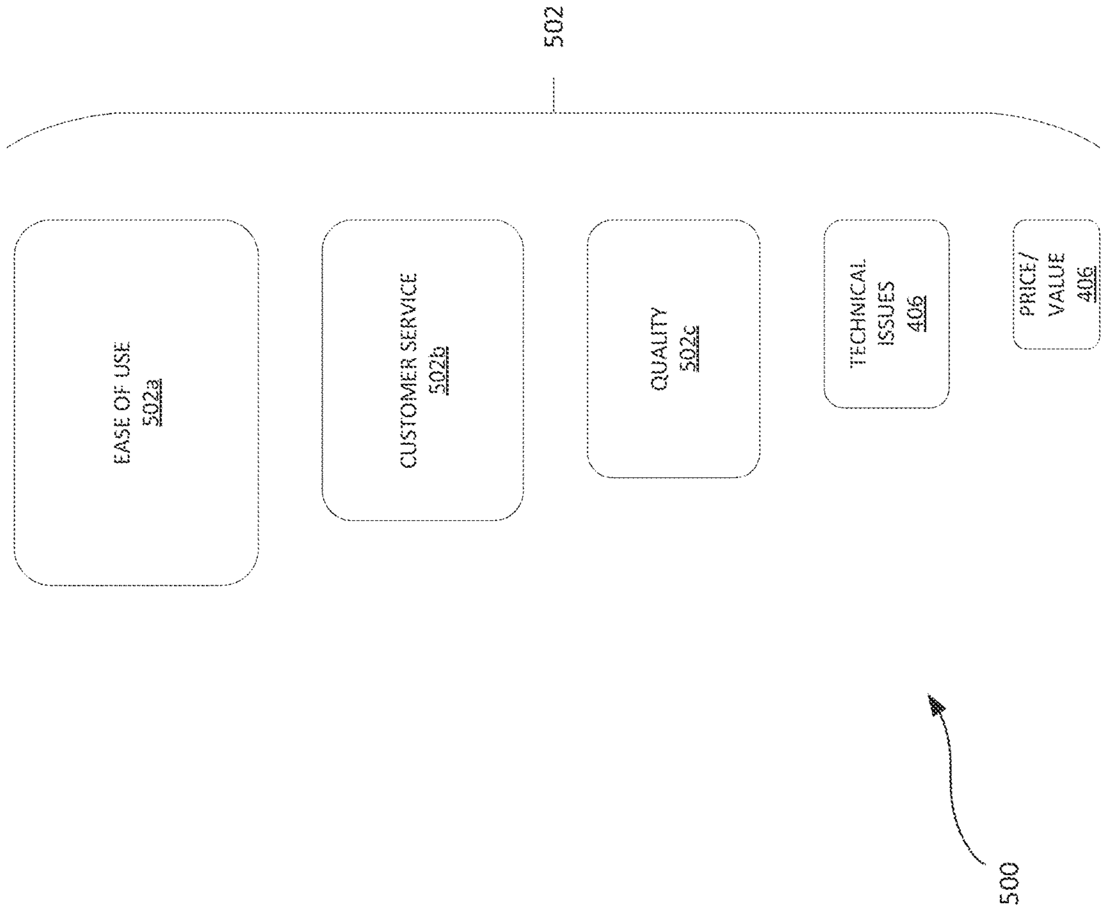
FIG. 5 illustrates a graphical output according to embodiments.

FIG. 5 illustrates one embodiment of a graphical output 500 that may be generated via process 400. As illustrated, the graphical output 500 includes a number of text boxes 502 that each represent an individual cluster. While shown here with five clusters (for a K value of 5), it will be appreciated that any number of text boxes 502 for any number of clusters may be displayed. Additionally, in some embodiments, the number of text boxes 502 displayed may be fewer than the number of clusters generated by process 500. In some embodiments, the text boxes 502 may be arranged in order of size. For example, the text box 502 having the greatest number of (or portion thereof, such as a phrase in the form of a trigram) within the text box 502 may be positioned at the top and/or bottom (or far left or far right) of the graphical output 500, while text boxes 502 of other sizes are arranged accordingly in ascending or descending order. This allows the most common comments to be displayed most prominently, as these comments may impact the most number of users. In some embodiments, the text boxes 502 may also be sized to represent the number of comments classified within. For example, the text box 502 associated with the largest number of comments may be displayed with a largest size, while a text box 502 associated with a fewest number of comments may be displayed as having a smallest size on a display screen. In some embodiments, additional visual aids may be utilized to indicate the frequency and/or perceived importance of a particular cluster. For example, a color and/or color intensity of each text box 502, a text size, and/or other feature may be adjusted to indicate the frequency and/or perceived importance of a particular cluster. Additionally, while illustrated with generally rectangular shapes, it will be appreciated that one or more of the text boxes 502 may have a different shape.

In some embodiments, each text box 502 may include and/or be associated with a classification term 502, which may indicate a general topic that each comment within the relevant cluster is direct toward. As just one example, the classification term may indicate that a first text box 502*a* may include comments related to the ease of use of a product, a second text box 502*b* may include comments related to customer service, a third text box 502*c* may include comments related to quality of a product, a fourth text box 502*d* may include comments related to technical issues, and a fifth text box 502*e* may include comments related to price or value. Each text box 502 may include some or all of the comments (or phrases derived therefrom) associated with a particular cluster. For example, in some embodiments, the three (or other predetermined number) comments (or phrases derived therefrom) closest to the centroid of the cluster may be displayed.

In some embodiments, the text boxes 502 may be interactive. For example, a user may hover a mouse icon, click on, and/or otherwise interact with a particular text box 502 to view additional details. For example, in some embodiments, interaction with a text box 502 may cause statistics associated with metrics (such as those related to frequency) of the cluster and/or associated comments to be displayed. In some embodiments, if a user interacts with a particular phrase or other portion within a text box 502, the full text of any comments associated with the phrase may be displayed. In some embodiments, clicking and/or otherwise interacting with a particular text box 502 may cause a graphic containing a list of all comments associated with a particular cluster to be displayed. The interactive nature of the graphical output 500 allows a user to select a text box 502 and/or cluster that the user wishes to learn more about and retrieve information in greater detail that is relevant to a particular topic.

Figure 6:
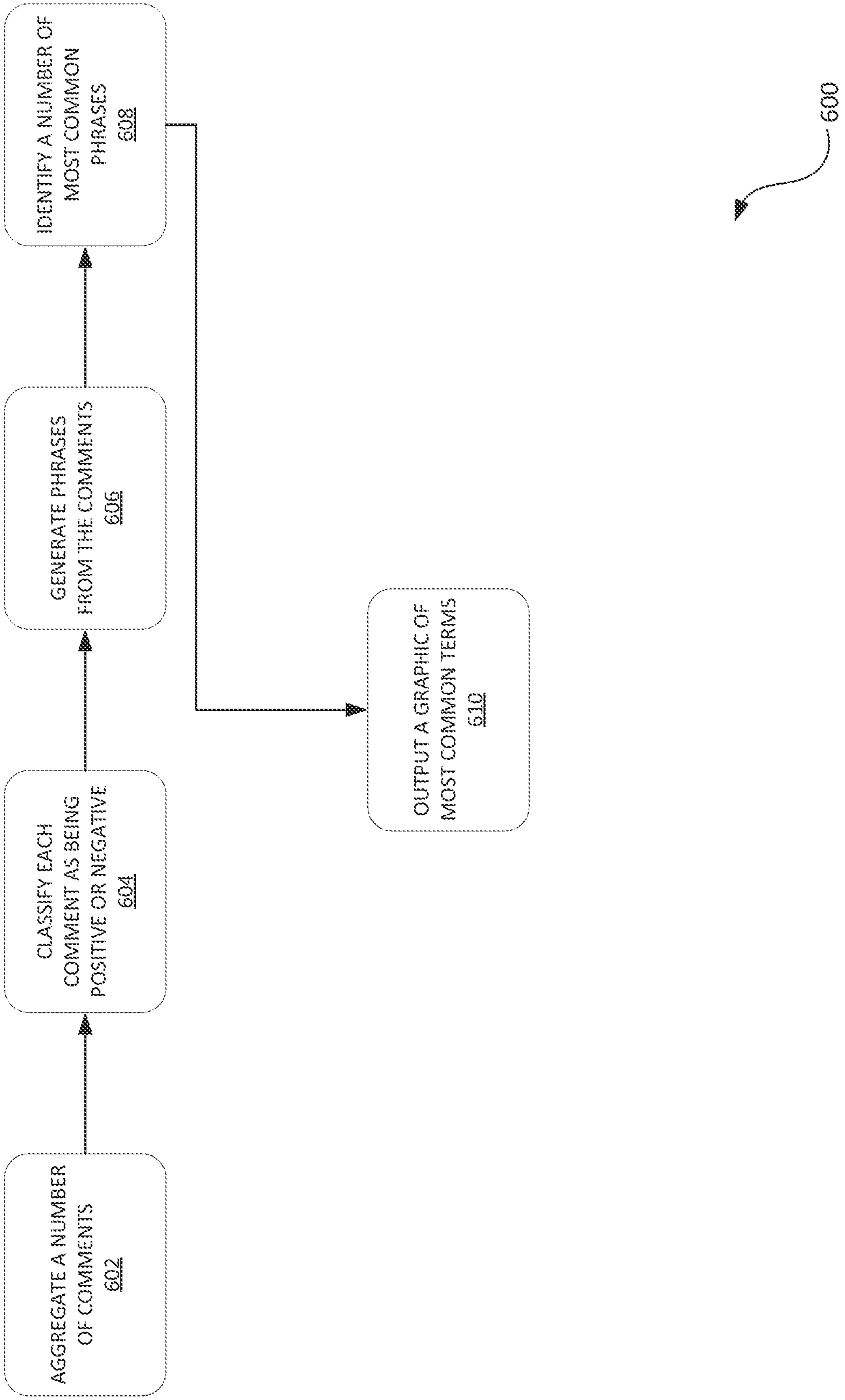
FIG. 6 is a flowchart for a process for performing sentiment analysis according to embodiments.

FIG. 6 is a flowchart illustrating a process 600 for providing sentiment analysis. Process 600 may be performed by a server, such as server 100. Process 600 may be similar to processes 200 and 400 described above and may be include some or all of the features associated with processes 200 and 400 to generate graphical various outputs. In some embodiments, process 600 may be performed in response to a request for sentiment analysis received from one or more remote computing devices, such as remote devices 108. Process 600 may begin at block 602 by aggregating a plurality of text-based comments. This may be done, for example, by retrieving the comments from one or more sources, such as a database of product and/or service reviews, mobile application review database, and/or social media database such as those described above. For example, the server may determine which database(s) should be polled for the information (the determination may be based on instructions within the request from the remote computing device, which may be received via a frontend website interface) and may interface with the database(s) using a relevant API call to request the desired comments. In some embodiments, the API call may specify a product, service, brand, and/or other classification data that is related to a set of comments. In some embodiments, such as when the comments are social media posts, the request may include one or more data tags, such as hashtags. Any posts that include the relevant data tag may be retrieved for analysis.

The text-based comments may be classified as being associated with a particular a polarity (e.g. positive or negative) of sentiment at block 604. In some embodiments, this classification may be performed based on a score associated with each of the text-based comments. For example, the score may be used to classify each comment. Oftentimes the score may be assigned by a person who left the comment and may be retrieved from the source along with the comment. In other embodiments, some or all of the retrieved may not include scores left by the user who posted the comment. In such embodiments, the server may utilize a trained machine learning module to analyze the unscored comments and classify them according to sentiment. Such a training and classification process is described in greater detail in relation to FIGS. 7 and 8.

At block 606, a number of phrases may be generated from the text-based comments. To generate the phrases, the backend service model may remove one single-letter words, two-letter words, words on a pre-defined list, punctuation, and/or numbers from each of the comments to form sets of remaining words for each of the comments. In some embodiments, the backend service model may also lemmatize the sets of remaining words for each of the comments to generate the phrases (which may include one or more terms). In some embodiments, some or all of the comments used for training purposes may be translated from one language to another language. In some embodiments, comments that are classified as being neutral may be removed. In some embodiments, generating the phrases may involve lemmatizing words for each of the plurality of comments. At least some of the lemmatized words may be converted into tri-grams (and/or other groups having a set number of terms) to generate the phrases.

At block 608, a predetermined number of most common phrases for a particular polarity of sentiment may be identified from the plurality of phrases. This may include, for example, count-vectorizing each phrase to generate a frequency of each phrase. In some embodiments, prior to identifying the predetermined number of most common phrases the phrase may be grouped into topic groups. For example, a clustering algorithm may be executed to group the phrases into a predetermined number of clusters that represent different categories of topics present within the various comments. A cluster representing the greatest number of comments may then be identified.

At block 610, a graphic that includes the predetermined number of most common phrases for the particular polarity of sentiment may be output. This output may be presented using a display device and/or may be sent to a remote device over one or more networks. Such graphic may be similar to those described in relation to FIGS. 3 and 5. For example, in some embodiments, the graphic may include the predetermined number of most common phrases arranged based on topic groups. In such embodiments, a display size of each of the topic groups may be based on a respective number of the predetermined number of most common phrases falling into each respective topic group. In some embodiments, an orientation of each of the most common phrases within the graphic is determined based at least in part on a shape of the graphic and/or a location of a particular one of the most common phrases within the graphic. For example, if the graphic is an irregular shape, such as a thumbs-up graphic, phrases that are displayed within the thumb, rather than the hand, may be arranged vertically to take advantage of the space available within the thumb portion of the graphic. In some embodiments, a size and/or a shape of the graphic may be determined based on the polarity of the sentiment associated with the most common phrases within the graphic. For example, positive comments may be displayed within a thumbs-up graphic, while negative comments may be displayed within a thumbs-down graphic. In some embodiments, the graphic further may include an indication of a relative number of the phrases that fall within the predetermined number of most common phrases. For example, a metric, such as a percentage of the total number of comments/phrases analyzed that fall within the most common phrases may be displayed, although other statistics and metrics are possible.

In some embodiments, process 600 may also include generating one or more reports for viewing and/or transmission to one or more remote devices. The reporting can be generated based on any of the outputs described above. Reports may include combination of any or all information and graphics that may be useful for evaluating a particular product, service, and/or brand based on comments. Such reporting provides practical implementations that allow vast collections of comments to be analyzed and classified and outputted in readily understandable formats, without the need for humans to review the individual comments, thereby saving hundreds or thousands of hours of man hours to review and analyze relevant remarks.

Figure 7:
FIG. 7 is a flowchart for a process training a backend service model to perform sentiment analysis according to embodiments.

FIG. 7 illustrates a process 700 for training a backend service model to perform sentiment analysis. Oftentimes, the backend service model will be operated at by a host server (which may or may not be server 100). In some embodiments, the training process 700 may be performed on the server, while in other embodiments, the backend service model may be trained as a local program on a local computing device and later uploaded to a server for cloud computing purposes. At block 702, a number of comments, reviews, and/or other text and/or other characters may be aggregated. This may be done, for example, by pulling or otherwise retrieving the relevant text from one or more sources. For example, the source may be a rating/review website, a website and/or database operated by the entity performing the training and/or sentiment analysis, a mobile application store, a merchant site, etc. In such embodiments, the relevant text may be grouped, tagged, indexed, and/or otherwise organized by topic, so the backend service model may only retrieve data that is pertinent to the particular training application. The backend service model may interface with the source using an API that allows the backend service model to download and/or otherwise access the relevant text. In some embodiments, the source may include a social media site or application. For example, the backend service model may submit a query for social media messages containing a particular data tag, such as a hashtag, which may be returned for analysis.

At block 704, each comment may be classified as being positive or negative, based on the sentiment associated with the respective comment. In some embodiments, this may be done based on a score associated with each of the comments. For example, formal reviews on websites and the like are often associated with a score rating that may be provided to the backend service model along with the comments. If such scores are provided, the backend service model may classify each comment as having a positive or negative (or neutral) sentiment based on its associated scored. In other embodiments, such as where social media posts are used (or in embodiments where no formal ratings have been assigned), each comment may be reviewed by a human who may input a score. Such scoring may be particularly applicable in cases in which emoji are used. A human may assign various emoji with different scores associated a sentiment the emoji is believed to represent. Any human-generated scoring may be used by the backend service model to classify the related comments as being positive, negative, or neutral. In some embodiments, those comments having neutral sentiments may be eliminated from the training process.

Once the comments have been classified as being positive or negative (or possibly neutral), the various comments may be broken down into individual words, such as by word tokenizing the comments, at block 706. In some embodiments, once the comments are broken up into individual words various processing may be performed to make the comments more uniform, one or more additional processing measures may be performed at block 708. For example, any punctuation may be removed, numbers may be removed or converted into text where appropriate (i.e. converting "2" into "to", "two", or "too" when the context of a comment suggests a user inputted the number to represent a letter and/or word), removing single-letter and/or two-letter words, expanding abbreviations into the full word(s), converting all letters into a single case (i.e. all uppercase or all lowercase), and/or other processing to make the format of each of the comments more uniform. In some embodiments, words that have been deemed irrelevant to the determination of sentiment may be removed, such as by checking the words within the comments against a list (such as a Stop Words list) and removing any words that match those on the list. In some embodiments, before and/or during the processing steps described above, some or all of the comments (or a portion of one or more comments) may need to be translated from one language to another. A machine translation engine may be utilized to detect the language of the comment and automatically translate the text within the comment into a desired language. In other embodiments, if a comment is in a language that is not desired (such as if the backend service model has not been programmed to handle the particular language), such comments may be discarded rather than translated.

At block 710, once the comments and words have gone through any processing, the remaining words may be stemmed or lemmatized, such as by using a part of speech of the words, to group together the inflected forms of a word so they can be analyzed as a single term. At this point, the grouped words, polarity of sentiment of the original comments (and by extension, the words derived from the comments), and the original text of the comments may be associated with one another in a database, such as a Python Pandas Dataframe. The database may then be analyzed to identify the most "important" terms at block 712. For example, the terms may be vectorized (converted into numbers) and/or a term frequency inverse document frequency calculation (TF-IDF) may be performed on the database. After the importance of the various terms has been determined, a vector of lemmas (or other terms) and TF-IDF (or similar) weights for each comment is output at block 714. A sentiment classification model may be trained using these outputs at block 716. For example, the model may be trained to recognize certain phrases (terms and/or groupings of terms) and correlate the phrases with a particular sentiment based on the scores of the original comments. The vector of lemmas (or other terms) may be used as an input to the model and the related sentiment polarity as the model output to train the model, such as by using a logistic regression algorithm. In some embodiments, the model may be ready to use. In other embodiments, the trained model may be output and formatted to be saved to another location. In some embodiments, the model may be output as a Python pickle object, which "serializes" the object first before writing it to file by converting a python object into a character stream. The resulting character stream contains all the information necessary to reconstruct the object in another python script. This allows the object (here the classification model) to be saved to a disk. The pickle (or otherwise formatted classification model) may be copied to a server for use as a cloud-based sentiment analysis script tool that takes text and/or character-based inputs and provides outputs related to a polarity of the sentiment of the input.

Figure 8:
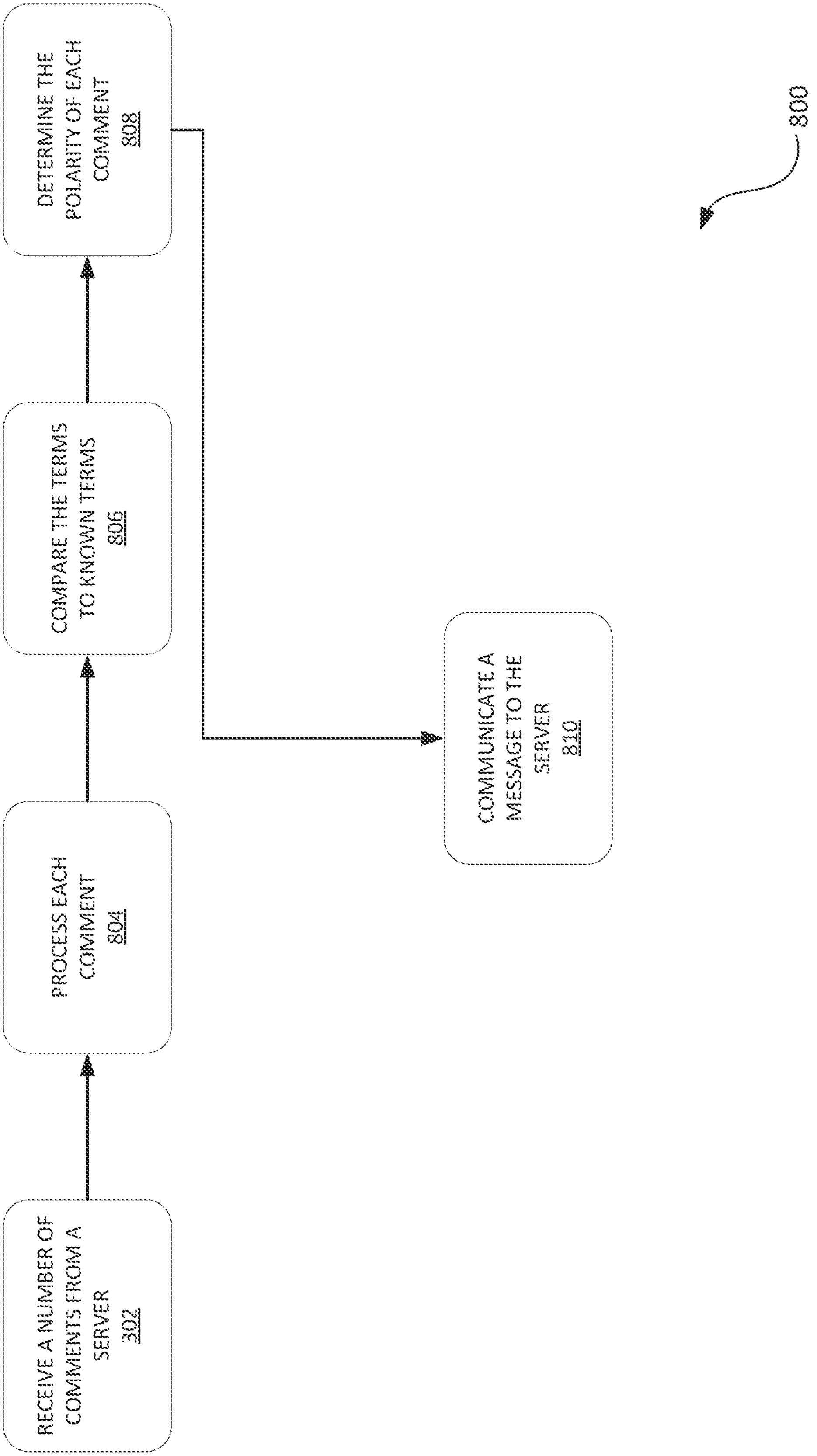
FIG. 8 is a flowchart for a process for analyzing the sentiment of a comment or phrase using a backend service mode according to embodiments.

FIG. 8 is a flowchart illustrating a process 800 for analyzing the sentiment of a comment or phrase using the backend service model described above. Process 800 may be used to analyze the sentiment of comments that are not associated with a user-assigned score. Process 800 may be performed in conjunction with processes 200, 400, and/or 600 to help classify any number of comments based on their sentiment prior to producing the outputs associated with the processes 200, 400, and/or 600. Process 800 may begin at block 402 by receiving any number of comments from a server, such as server 100. For example, the server may recognize that each comment has no associated score and may need assistance in classifying the various comments are being associated with a positive or negative sentiment. The backend service model may then process each comment at block 804. For example, each comment may be broken down into individual words, such as by word tokenizing the comments. In some embodiments, once the text is broken up into individual words, further processing may be performed, such as removing any punctuation, removing any numbers and/or converting numbers into text where appropriate, removing single-letter and/or two-letter words, expanding any abbreviations into the full word(s), converting all letters into a single case (i.e. all uppercase or all lowercase), and/or other processing. In some embodiments, words that have been deemed irrelevant to the determination of sentiment may be removed, such as by checking the words within each comment against a list (such as a Stop Words list) and removing any words that match those on the list. Any remaining words may be stemmed or lemmatized, such as by using a part of speech of the words, to group together the inflected forms of a word so they can be analyzed as a single term. In some embodiments, before and/or during the processing steps described above, the text and/or other characters (or a portion thereof) may need to be translated from one language to another. A machine translation engine may be utilized to detect the language of the text and/or other characters and automatically translate the text within the text and/or other characters into a desired language.

The backend service model may then compare the resulting terms to those in a database of known terms/phrases at block 806, where each of the known terms/phrases is associated with a particular polarity of sentiment. Based on the comparison, the backend service model determines the polarity of a sentiment associated with the original comment at block 808. At block 810, the backend service model may then communicate a message and/or command to the server from which the comments were received. The server may then classify each comment accordingly based on the determined polarity of sentiment assigned by the backend service model.

In some embodiments, a phrase within the comment entered provided by the server may include and/or consist only of a non-text based message, such as an emoji. In such embodiments, the server may pass the emoji and/or a character string representing the emoji to the backend service model. The backend service model may compare the emoji and/or the character string to known emoji and/or character strings representing known emoji (which are known from the comments used to train the backend service model) to determine the sentiment and polarity thereof associated with the particular emoji. Based on this comparison, the backend service model may then return a message to the server that indicates the polarity of the sentiment of the emoji.

In some embodiments, if a particular phrase is unrecognized (i.e., the phrase does not match and/or is not similar to any phrases that were analyzed during training of the backend service model), the backend service model may be programmed to return a particular default message. For example, in some embodiments, the backend service model may be configured to provide a message to the server indicating that the sentiment cannot be determined. It will be appreciated that other methods of handing unrecognized sentiments may be utilized to meet the needs of a particular application.

In some embodiments, once the sentiment analysis has been performed on a desired subset of phrases, further analysis may be performed (such as by server 100) to provide additional detail about trends in the sentiment associated with a particular product and/or brand. Such analysis may incorporate the sentiment into practical applications which generate and present graphical representations of trends in sentiment analysis over time, enabling users to easily monitor and respond to changes. In some embodiments, information from previously disclosed outputs (such as the thumbprint graphics described in relation to FIG. 3) may be combined with the trend analysis to further provide context to changes in sentiment analysis. Some applications may involve the server 100 providing automatic suggestions to end users on how to improve the product and/or brand based on this information. In some embodiments, data associated with particular product and/or brand events (such as launches of new software versions for a product, product redesigns, marketing campaigns, etc.) may be tracked alongside the sentiment trends to further illustrate the impact of such events on the sentiment.

In a particular embodiment, server 100 (or another computing device) sentiments may be grouped based on a timeframe of interest (such as a particular day, week, month, year, etc.). Once grouped, a sentiment for the timeframe of interest may be computed as a function of time. For example, if the timeframe of interest is a week, sentiments for a number of different weeks may be grouped. The sentiments from each week may be aggregated and counted to how many of the total sentiments from each week are positive, negative, and/or neutral. In some embodiments, this classification may be based on a sentiment score, such as described in process 200 above. These sentiment counts may be converted into percentages of the overall number of sentiments for a given week. Once the percentages have been determined, a graphical representation may be generated that illustrates the sentiment percentages over time. In some embodiments, rather than graphing the percentages, the raw numbers of sentiments of each polarity may be graphed.

Figure 9:
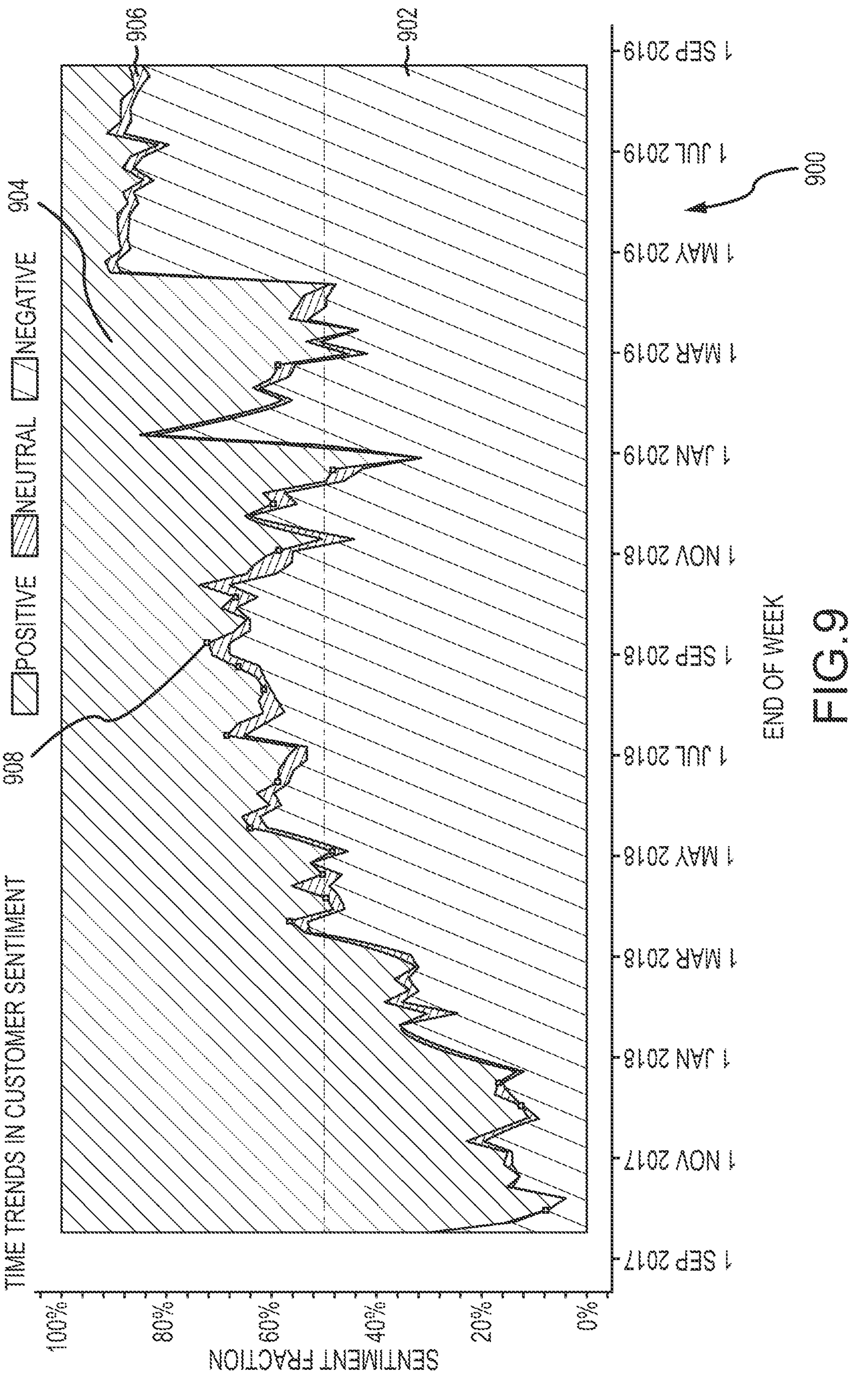
FIG. 9 is a graph illustrating trends in sentiment percentage over time according to embodiments.

For example, FIG. 9 illustrates a graph 900 that illustrates trends in sentiment percentages over time. As illustrated, the timeframe of interest is one week, however any other timeframe of interest is possible in other embodiments. Here, the weekly sentiment percentages are mapped over a period of approximately two years, however any length of trend analysis is possible. As illustrated, a lower portion of the graph 900 includes a positive sentiment percentage 902, which may be depicted in a first color and/or pattern. A top portion of the graph 900 includes a negative sentiment percentage 904, which may be depicted in a second color and/or pattern that is different than the first. Positioned between the positive sentiment percentage 902 and the negative sentiment percentage 904 is a neutral sentiment percentage 906, which may be displayed in a third color and/or pattern that is distinct from the first and second. As just one example, the positive sentiment percentage 902 may be represented by a green area, the negative sentiment percentage 904 may be represented by a red area, and the neutral sentiment percentage 906 may be represented by a yellow or orange area. By graphing the various sentiment percentages as stacked areas, a quick determination of the relative percentages of each polarity of sentiment is possible.

In some embodiments, one or more of the sentiment percentages (positive, negative, neutral) may be omitted from the graph 900. For example, rather than including a neutral sentiment percentage, only the positive sentiment percentage 902 and the negative sentiment percentage 904 may be included. In some embodiments, this may be done by omitting the neutral sentiments entirely, while in other embodiments the neutral sentiments may be combined with the positive sentiment percentage 902 or the negative sentiment percentage 904. Additionally, while shown with the sentiment percentages arranged on graph 900 from positive to negative from a bottom to a top of the graph 900, it will be appreciated that the sentiment percentages may be arranged in any order.

As illustrated, the x-axis of graph 900 has time-based values showing dates over the timeframe of the trend analysis, while the y-axis illustrates a percentage of a particular sentiment polarity relative to the total number of sentiments for a particular timeframe of interest. Thus, the lowest-positioned sentiment percentage on the graph 900 (here, the positive sentiment percentage 902) may be read using the y-axis label directly based on the peak of that sentiment percent for a given date. In contrast, the highest-positioned sentiment percentage on the graph 900 (here, the negative sentiment polarity) may be read by subtracting the percentage of the lowest point of that sentiment percentage from 100%. In some embodiments, an additional y-axis may be provided with percentage labels increasing from a top to a bottom of the graph 900 to make reading the highest-positioned sentiment percentage more straightforward.

In some embodiments, additional data points may be provided on the graph 900. For example, data points for a number of events 908 are plotted on the graph 900. The events 908 may represent dates on which launches of new software versions for a product, product redesigns, marketing campaigns, and/or other events related to the brand and/or product. In some embodiments, the data points for the events 908 and/or a legend may be provided that includes an explanation of each event 908. The inclusion of events 908 on the graph 900 provides context that may help understand a particular trend shown in the graph 900. For example, the launch of a new product and/or software version may drive positive feedback. As another example, a software launch for a product that was later found to include significant software bugs may correspond to more negative sentiment being received.

In some embodiments, the sentiment percentages depicted in graph 900 may be tied to other types of sentiment analysis. For example, the sentiment percentages may be analyzed in conjunction with the thumbprint graphics described above to not only identify trend in the sentiments, but to correlate these trends with particular feedback from users. For example, when a polarity of sentiment is trending in a particular direction, the most common phrases associated with a particular polarity of sentiment (which could be the same or different as the sentiment trend being analyzed) may be identified to determine a possible cause of the trend. As one example, if the negative sentiment is trending upward in graph 900, most common negative sentiment phrases may be identified from the sentiment analysis. These most common negative sentiment phrases may provide context that indicates why the negative sentiment is trending upward. For example, a most common phrase may be "app is buggy" for a software program that is failing to operate correctly. The server 100 may determine that a bug-riddled software version is to blame for the downward trending sentiment. The server 100 may further correlate this information with data points about events 908 to further identify a cause.

In some embodiments, the server 100 may be configured to generate suggestions based on the analysis of sentiment trends, most common phrases, events 908, and/or other information. For example, in the embodiment in which a particular software version was determined to include software bugs that were causing problems, the server 100 may send an alert to one or more remote computing devices that the software likely needs to be reviewed and patched. These alerts may be sent as SMS messages, email, push notifications, and/or in other electronic formats. Additionally, such alerts may be generated and/or sent any time the server 100 detects a likely cause of a particular trend. In some embodiments, rather than trying to reverse a downward trend, the server 100 may provide suggestions on how to increase an upward trend, such as by analyzing negative sentiment phrases or trying to further enhance aspects of a product and/or brand that have been shown to resonate with users of the brand and/or product.

Figure 10:
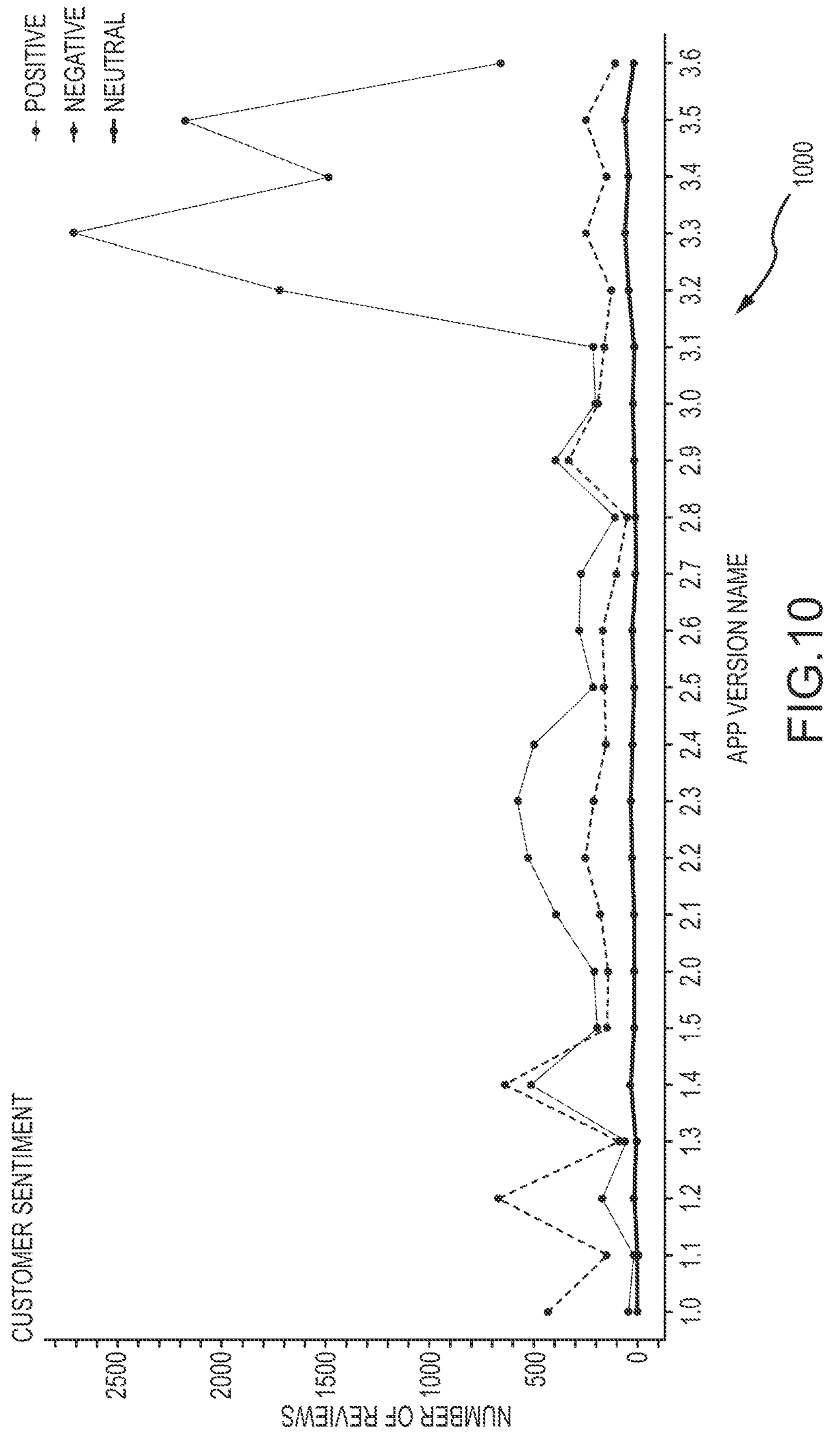
FIG. 10 is a graph illustrating sentiment percentage per product version according to embodiments according to embodiments.

In another embodiment, a graph 1000 may be generated that shows the sentiment percentage and/or raw review numbers for each sentiment polarity for a number product versions as illustrated in FIG. 10. Graph 1000 may be particularly useful in applications where the product is a software product and each version may be a new version of the software (such as a software update). Graph 1000 enables users to quickly discern which versions of the product have been most well or poorly received, with numbers and/or percentages of each polarity of sentiment being plotted for each product version. For example, as illustrated here, the software version 3.1 saw a significant spike in positive sentiment, both in terms of raw number of positive reviews and in terms of relative volume of positive reviews to total reviews. Graph 1000 may quickly highlight progress and inform users of most successful versions. A user may then take this information and identify changes in product versions to get a better understanding of what changes to the product from one version to another may have accounted for the trends exhibited in the graph 1000.

In some embodiments, the version-based sentiments shown in graph 1000 may be tied to other types of sentiment analysis. For example, the version-based sentiments may be analyzed in conjunction with the thumbprint graphics described above to not only identify version-based sentiments, but to correlate these version-based sentiments with particular feedback from users. For example, when a version-based sentiments is lower or higher than another version-based sentiments, the most common phrases associated with a particular product may be identified to determine a possible cause of the change. In some embodiments, the server 100 may be configured to generate suggestions based on the analysis of version-based sentiments, most common phrases, events 908, and/or other information. For example, the most common phrases associated with a particular product version may indicate a problem with the product that needs to be addressed. This problem may be included in an alert to one or more remote devices.

Figure 11:
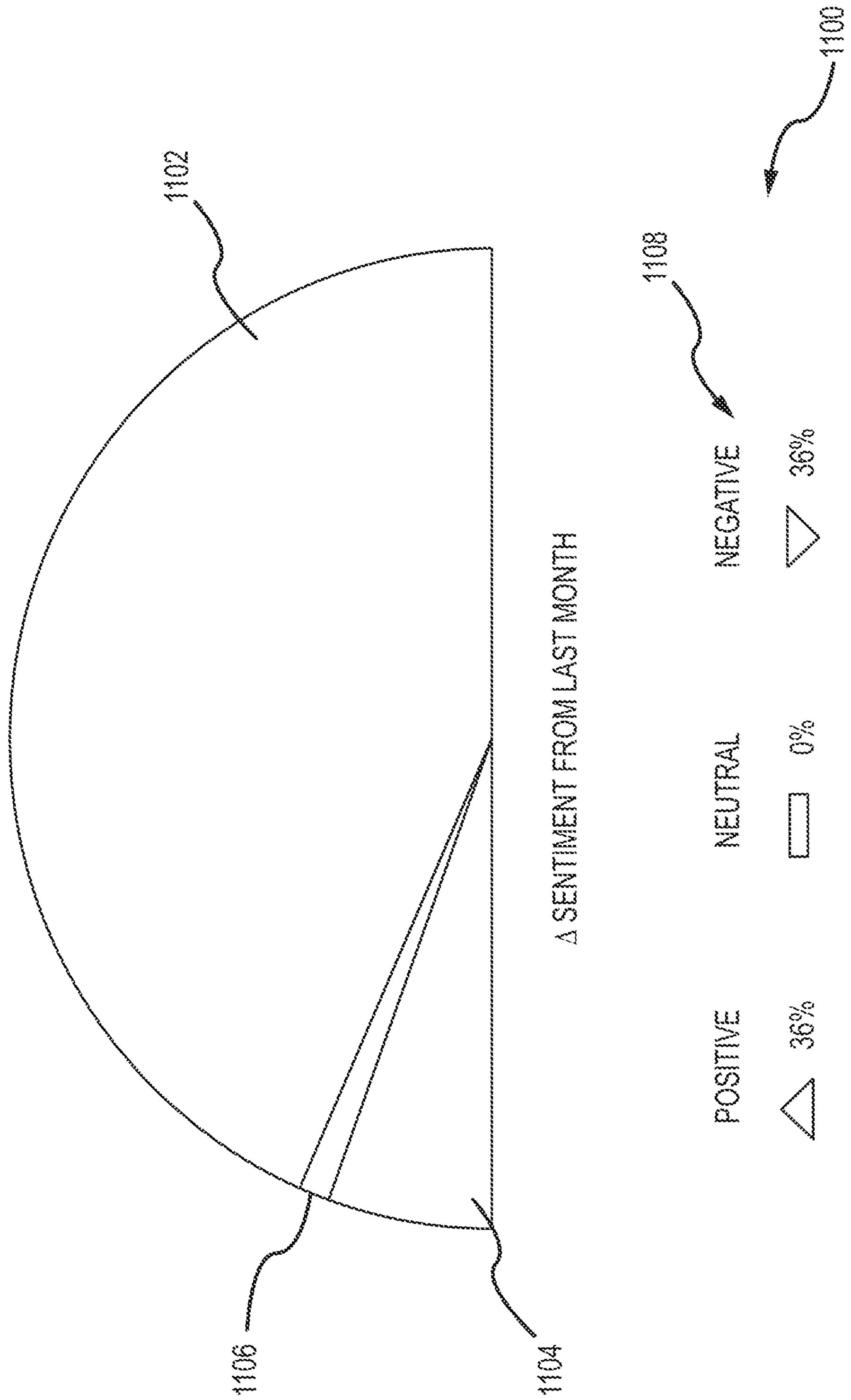
FIG. 11 is a graph illustrating changes in sentiment percentage from a previous timeframe of interest according to embodiments.

In another embodiment, a sentiment percentage for each polarity of sentiment may be calculated and graphed for a particular timeframe of interest. In some embodiments, a change in the sentiment percentage from each polarity from a previous timeframe of interest may be provided. For example, in FIG. 11 graph 1100 depicts a positive sentiment percentage 1102 in a first color and/or pattern, a negative sentiment percentage 1104 in a second color and/or pattern that is different than the first, and a neutral sentiment percentage 1106, which may be displayed in a third color and/or pattern that is distinct from the first and second. As just one example, the positive sentiment percentage 1102 may be represented by a green area, the negative sentiment percentage 1104 may be represented by a red area, and the neutral sentiment percentage 1106 may be represented by a yellow or orange area. A legend 1108 is provided that indicates how the sentiment percentages changed relative to the previous timeframe. For example, in graph 1100, the positive sentiment percentage 1102 represented a 36% increase from the previous timeframe, the neutral sentiment percentage 1104 showed no change, and the negative sentiment percentage 1106 decreased 36%.

In some embodiments, the various graphs described herein may be interactive. For example, a user may be able to zoom into a particular area of interest to get a different view of certain details. In other embodiments, the user may be able to adjust the ranges of the values on the axes and/or select a particular timeframe for the analysis. In other embodiments, additional data may be available when a user hovers an icon over a portion of the graph and/or otherwise interacts with the graph. For example, if the user hovers over an event 908, additional information, such as the date and/or type of the event may be provided. In embodiments including analysis related to different product versions, notes about what changed in the product version may be accessed (either in a popup window and/or the opening of a new page) when a user interacts with the particular version information. It will be appreciated that any additional data may be provided in the interactive graphs to meet the needs of a particular application. Additionally, data used to generate the graphs may be stored for future use, such as for inclusion in future graphs.

In some embodiments, one or more graphs may be sent and/or otherwise accessed by remote computing devices over a network. The graphs may be sent on their own and/or with other data, such as a report. The graphs and/or reports may be generated, sent, and/or otherwise made available using a website and/or via a transmission of a SMS message, email, URL, and/or other electronic format. In some embodiments, the graphs and/or reports may be generated, sent, and/or otherwise made available based on a request from a remote device. In other embodiments, the graphs and/or reports may be generated, sent, and/or otherwise made available automatically. For example, the server 100 and/or other computing device may generate, send, and/or otherwise make available the graphs and/or reports available periodically, based on a threshold of a particular sentiment being reached (such as over 10%, 20%, 30%, etc. negative feedback) being received), based on a direction change in a sentiment trend, based on the occurrence of a particular event (such as a launch of a new product version), and/or based on other trigger mechanism. In other embodiments, the graphs may be updated in real-time and provided on an accessible platform, such as a website or mobile application.

In some embodiments, where a particular product may be tied to one or more brands and/or sources, the server 100 and/or other computing device may be configured to disaggregate the sentiment from each brand and/or source such that the sentiment analysis of the product may be performed on a per brand/source basis. This may be done, for example, by analyzing the source (such as a brand website) of the review from which the sentiment was derived and/or by analyzing the content of the review (such as to identify any brand/source-identifying terms). While typically described in the context of a product, similar analysis may be performed to analyze the sentiment and trends of any object, such as frequently asked questions (e.g., "Was this Helpful? Yes or No?" prompts) and/or other non-product related concepts.

In some embodiments, the server 100 may consider customer complaints (such as on third-party sites, on a website associated with a particular product, etc.) and/or media coverage (i.e., positive/negative news stories/articles and/or social media posts) when evaluating sentiment trends. In particular, the media coverage may be useful to inform users as to a potential cause of a particular trend. In some embodiments, the server 100 may send the media post in an alert to one or more remote devices. In some embodiments, product releases of competing and/or related products may be considered, and may be plotted over time. This may help identify competing interests for a particular product that may affect public perception of the product (e.g., launch of a superior product may lead to more negative reviews based on the current product being inferior to the competing product). Trend graphs may be generated showing the user of the subject product over time and/or use of the competing product over time, possibly along with the sentiment trends of one or all relevant products. In some embodiments, when the product is a software product, trends may be monitored based on which operating system a review for a software product is associated with.

In some embodiments, the server 100 may be used to predict likely end users of a particular product. For example, the server 100 and/or other computing device may analyze sentiment trends of reviewers in a given geographic region. The server 100 may then extrapolate potential end users in that particular geographic region based on one or more similar characteristics/factors (such as demographic factors) shared with favorable/negative/neutral reviewers and/or by analyzing other demographic information of reviewers.

Figure 12:
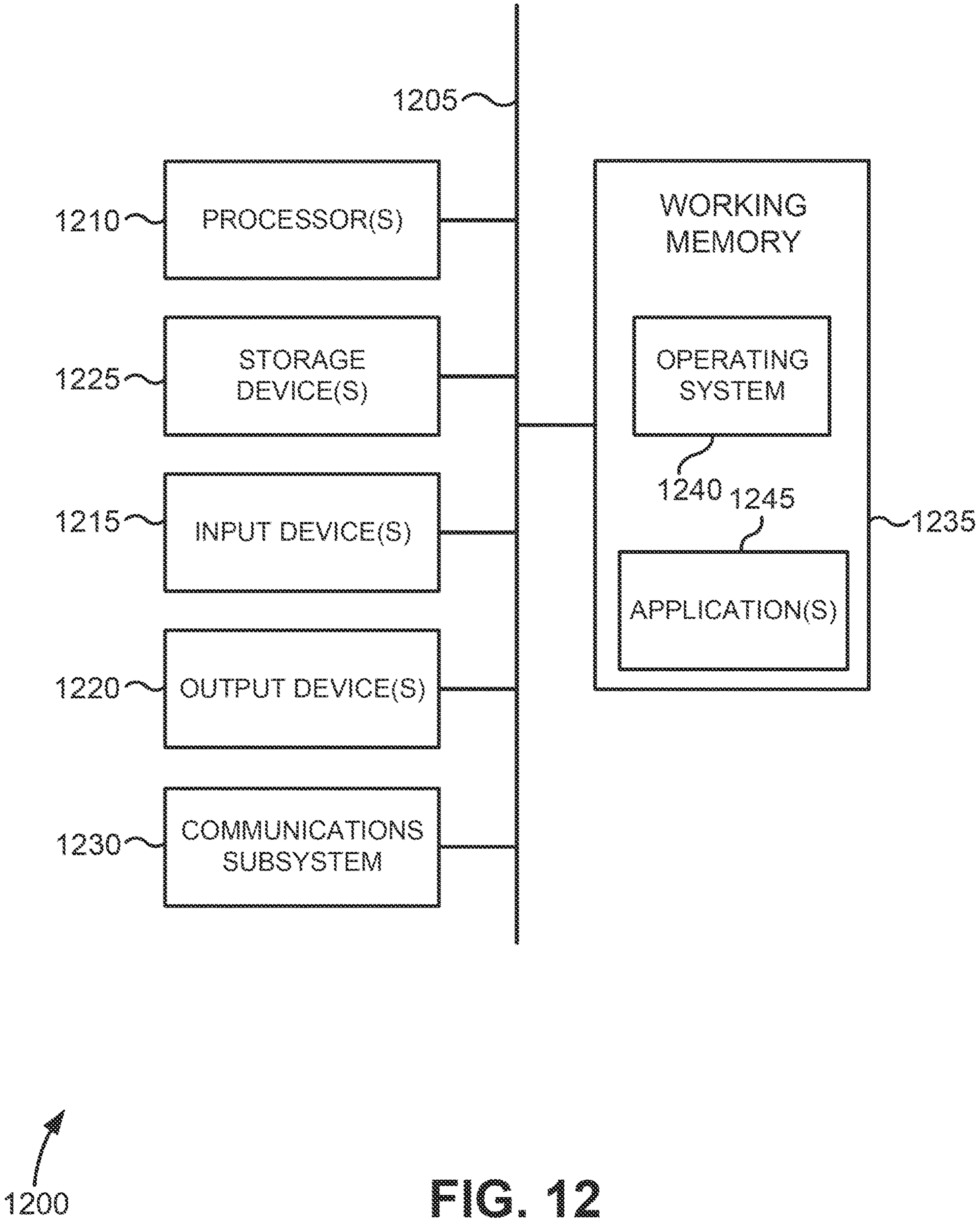
FIG. 12 is a system diagram of a computing device according to embodiments.

A computer system as illustrated in FIG. 12 may be incorporated as part of the previously described computerized devices. For example, computer system 1200 can represent some of the components of computing devices, such as servers that host the servers and/or remote devices described herein. FIG. 12 provides a schematic illustration of one embodiment of a computer system 1200 that can perform the methods provided by various other embodiments, as described herein. FIG. 12 is meant only to provide a generalized illustration of various components, any or all of which may be utilized as appropriate. FIG. 12, therefore, broadly illustrates how individual system elements may be implemented in a relatively separated or relatively more integrated manner.

The computer system 1200 is shown comprising hardware elements that can be electrically coupled via a bus 1205 (or may otherwise be in communication, as appropriate). The hardware elements may include a processing unit 1210, including without limitation one or more processors, such as one or more special-purpose processors (such as digital signal processing chips, graphics acceleration processors, and/or the like); one or more input devices 1215, which can include without limitation a keyboard, a touchscreen, receiver, a motion sensor, a camera, a smartcard reader, a contactless media reader, and/or the like; and one or more output devices 1220, which can include without limitation a display device, a speaker, a printer, a writing module, and/or the like.

The computer system 1200 may further include (and/or be in communication with) one or more non-transitory storage devices 1225, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 1200 might also include a communication interface 1230, which can include without limitation a modem, a network card (wireless or wired), an infrared communication device, a wireless communication device and/or chipset (such as a Bluetooth™ device, an 502.11 device, a Wi-Fi device, a WiMAX device, an NFC device, cellular communication facilities, etc.), and/or similar communication interfaces. The communication interface 1230 may permit data to be exchanged with a network (such as the network described below, to name one example), other computer systems, and/or any other devices described herein. In many embodiments, the computer system 1200 will further comprise a non-transitory working memory 1235, which can include a RAM or ROM device, as described above.

The computer system 1200 also can comprise software elements, shown as being currently located within the working memory 1235, including an operating system 1240, device drivers, executable libraries, and/or other code, such as one or more application programs 1245, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such special/specific purpose code and/or instructions can be used to configure and/or adapt a computing device to a special purpose computer that is configured to perform one or more operations in accordance with the described methods.

A set of these instructions and/or code might be stored on a computer-readable storage medium, such as the storage device(s) 1225 described above. In some cases, the storage medium might be incorporated within a computer system, such as computer system 1200. In other embodiments, the storage medium might be separate from a computer system (e.g., a removable medium, such as a compact disc), and/or provided in an installation package, such that the storage medium can be used to program, configure and/or adapt a special purpose computer with the instructions/code stored thereon. These instructions might take the form of executable code, which is executable by the computer system 1200 and/or might take the form of source and/or installable code, which, upon compilation and/or installation on the computer system 1200 (e.g., using any of a variety of available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system. For example, a risk management engine configured to provide some or all of the features described herein relating to the risk profiling and/or distribution can comprise hardware and/or software that is specialized (e.g., an application-specific integrated circuit (ASIC), a software method, etc.) or generic (e.g., processing unit 1210, applications 1245, etc.) Further, connection to other computing devices such as network input/output devices may be employed.

Some embodiments may employ a computer system (such as the computer system 1200) to perform methods in accordance with the disclosure. For example, some or all of the procedures of the described methods may be performed by the computer system 1200 in response to processing unit 1210 executing one or more sequences of one or more instructions (which might be incorporated into the operating system 1240 and/or other code, such as an application program 1245) contained in the working memory 1235. Such instructions may be read into the working memory 1235 from another computer-readable medium, such as one or more of the storage device(s) 1225. Merely by way of example, execution of the sequences of instructions contained in the working memory 1235 might cause the processing unit 1210 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 1200, various computer-readable media might be involved in providing instructions/code to processing unit 1210 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 1225. Volatile media include, without limitation, dynamic memory, such as the working memory 1235. Transmission media include, without limitation, coaxial cables, copper wire, and fiber optics, including the wires that comprise the bus 1205, as well as the various components of the communication interface 1230 (and/or the media by which the communication interface 1230 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a magnetic medium, optical medium, or any other physical medium with patterns of holes, a RAM, a PROM, EPROM, a FLASH-EPROM, any other memory chip or cartridge, a carrier wave as described hereinafter, or any other medium from which a computer can read instructions and/or code.

The communication interface 1230 (and/or components thereof) generally will receive the signals, and the bus 1205 then might carry the signals (and/or the data, instructions, etc. carried by the signals) to the working memory 1235, from which the processor(s) 1205 retrieves and executes the instructions. The instructions received by the working memory 1235 may optionally be stored on a non-transitory storage device 1225 either before or after execution by the processing unit 1210.

The methods, systems, and devices discussed above are examples. Some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It should be noted that the systems and devices discussed above are intended merely to be examples. It must be stressed that various embodiments may omit, substitute, or add various procedures or components as appropriate. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known structures and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

The methods, systems, devices, graphs, and tables discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims. Additionally, the techniques discussed herein may provide differing results with different types of context awareness classifiers.

While illustrative and presently preferred embodiments of the disclosed systems, methods, and machine-readable media have been described in detail herein, it is to be understood that the inventive concepts may be otherwise variously embodied and employed, and that the appended claims are intended to be construed to include such variations, except as limited by the prior art.

Unless defined otherwise, all technical and scientific terms used herein have the same meaning as commonly or conventionally understood. As used herein, the articles “a” and “an” refer to one or to more than one (i.e., to at least one) of the grammatical object of the article. By way of example, “an element” means one element or more than one element. “About” and/or “approximately” as used herein when referring to a measurable value such as an amount, a temporal duration, and the like, encompasses variations of ±20% or ±10%, ±5%, or +0.1% from the specified value, as such variations are appropriate to in the context of the systems, devices, circuits, methods, and other implementations described herein. “Substantially” as used herein when referring to a measurable value such as an amount, a temporal duration, a physical attribute (such as frequency), and the like, also encompasses variations of ±20% or ±10%, ±5%, or +0.1% from the specified value, as such variations are appropriate to in the context of the systems, devices, circuits, methods, and other implementations described herein. As used herein, including in the claims, “and” as used in a list of items prefaced by “at least one of” or “one or more of” indicates that any combination of the listed items may be used. For example, a list of “at least one of A, B, and C” includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of “at least one of A, B, and C” may also include AA, AAB, AAA, BB, etc.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

Also, the words “comprise”, “comprising”, “contains”, “containing”, “include”, “including”, and “includes”, when used in this specification and in the following claims, are intended to specify the presence of stated features, integers, components, or steps, but they do not preclude the presence or addition of one or more other features, integers, components, steps, acts, or groups.

What is claimed is:

1. A method of providing sentiment analysis, comprising:

aggregating, by a processor, a plurality of comments from one or more data sources;

classifying, by the processor, the plurality of comments as being associated with a polarity of sentiment using machine learning module that is trained to detect sentiment;

providing, by the processor, an output indicative of the polarity of the sentiment;

identifying, by the processor, a trend in the polarity of the sentiment over a period of time;

identifying, by the processor, at least one most common phrase associated with the polarity of the sentiment over the period of time;

identifying, by the processor, contextual information from the at least one most common phrase that indicates why the trend in the polarity of the sentiment is trending in a particular direction;

correlating, by the processor, the contextual information from the at least one most common phrase with one or more data points about at least one event; and determining, by the processor, a cause of the trend in the polarity of the sentiment based at least in part on a correlation between the contextual information from the at least one most common phrase and the one or more data points about the at least one event.

2. The method of providing sentiment analysis of claim 1, further comprising:

processing, by the processor, at least some comments of the plurality of comments to generate individual terms; and comparing, by the processor, the individual terms to known terms that are each associated with a particular polarity of sentiment.

3. The method of providing sentiment analysis of claim 2, wherein:

the polarity of sentiment of the at least some comments is determined based on comparing the individual terms to the known terms.

4. The method of providing sentiment analysis of claim 1, wherein:

at least one comment of the plurality of comments comprises a non-text based message.

5. The method of providing sentiment analysis of claim 1, wherein:

each non-text based message comprises one or both of an emoji and a character string representing an emoji;

the method further comprises comparing each non-text based message to one or both of known emoji and known character strings; and the polarity of the sentiment of each non-text based message is determined based on comparing the non-text based message to the one or both of known emoji and known character strings.

6. The method of providing sentiment analysis of claim 1, further comprising:

aggregating the plurality of comments comprises receiving the plurality of comments from one or both of a website and a database.

7. The method of providing sentiment analysis of claim 6, further comprising:

determining that each comment of the plurality of comments received from the one or both of the website and the database has no associated sentiment score.

8. A computing system for providing sentiment analysis, comprising:

one or more processors; and a memory having instructions stored thereon that, when executed by the one or more processors, cause the one or more processors to:

aggregate a plurality of comments from one or more data sources;

classify the plurality of comments as being associated with a polarity of sentiment using a machine learning module that is trained to detect sentiment;

provide an output indicative of the polarity of the sentiment;

identify a trend in the polarity of the sentiment over a period of time;

identify at least one most common phrase associated with the polarity of the sentiment over the period of time;

identify contextual information from the at least one most common phrase that indicates why the trend in the polarity of the sentiment is trending in a particular direction;

correlate the contextual information from the at least one most common phrase with one or more data points about at least one event; and determine a cause of the trend in the polarity of the sentiment based at least in part on a correlation between the contextual information from the at least one most common phrase and the one or more data points about the at least one event.

9. The computing system for providing sentiment analysis of claim 8, wherein the instructions further cause the one or more processors to:

determine that the polarity of the sentiment of at least one comment of the plurality of comments is unrecognized; and provide an output indicating that the polarity of sentiment of the at least one comment cannot be determined.

10. The computing system for providing sentiment analysis of claim 8, wherein:

determining that the polarity of the sentiment of at least one comment of the plurality of comments is unrecognized comprises determining that a particular phrase within the at least one comment does not match and is not similar to at least one of a known term, a known emoji, or a known character string.

11. The computing system for providing sentiment analysis of claim 8, wherein:

at least some of the plurality of comments comprises a non-text based message;

the instructions further cause the one or more processors to compare each non-text based message to one or both of known emoji and known character strings, wherein at least some of the one or both of known emoji and known character strings are associated with human-assigned polarity scores that are indicative of a particular polarity of sentiment; and the polarity of the sentiment of each non-text based message is determined based on comparing the non-text based message to the one or both of known emoji and known character strings.

12. The computing system for providing sentiment analysis of claim 11, wherein:

the human-assigned polarity scores are used to train the machine learning module.

13. The computing system for providing sentiment analysis of claim 8, wherein:

each of the plurality of comments is associated with a particular product.

14. The computing system for providing sentiment analysis of claim 13, wherein the instructions further cause the one or more processors to:

generate a prediction of potential end users of the particular product based at least in part on a sentiment trend of reviewers in a given geographic region and demographic information of the reviewers.

15. A non-transitory computer-readable medium having instructions stored thereon that, when executed, cause a computing device to:

aggregate a plurality of comments from one or more data sources;

classify the plurality of comments as being associated with a polarity of sentiment using a machine learning module that is trained to detect sentiment;

provide an output indicative of the polarity of the sentiment;
identify a trend in the polarity of the sentiment over a period of time;
identify at least one most common phrase associated with the polarity of the sentiment over the period of time;
identify contextual information from the at least one most common phrase that indicates why the trend in the polarity of the sentiment is trending in a particular direction;
correlate the contextual information from the at least one most common phrase with one or more data points about at least one event; and
determine a cause of the trend in the polarity of the sentiment based at least in part on a correlation between the contextual information from the at least one most common phrase and the one or more data points about the at least one event.

16. The non-transitory computer-readable medium of claim 15, wherein the instructions further cause the computing device to:
train the machine learning module by:
aggregating a plurality of training comments; and
classifying each of the plurality of training comments as having a particular polarity of sentiment.

17. The non-transitory computer-readable medium of claim 16, wherein:
training the machine learning module further comprises:
word tokenizing at least some comments of the plurality of training comments;
processing the at least some comments to unify a format of the at least some comments;
removing one or more of single-letter words, two-letter words, words on a pre-defined list, punctuation, or numbers from each of the at least some comments to form sets of remaining words for each of the at least some comments;
lemmatizing the sets of remaining words for each of at least some comments to generate a plurality of known terms; and
associating the at least some comments, the plurality of known terms, and the particular polarity of sentiment with one another in a database.

18. The non-transitory computer-readable medium of claim 17, wherein the instructions further cause the computing device to:
process at least some comments of the plurality of comments to generate individual terms; and
compare the individual terms to the plurality of known terms that are each associated with a particular polarity of sentiment.

19. The non-transitory computer-readable medium of claim 17, wherein:
training the machine learning module further comprises:
analyzing the database to identify a set of most important terms;
outputting a vector of each of the most important terms and a weight for each of the at least some comments; and
using each vector and each weight as an input to train the machine learning module.

20. The non-transitory computer-readable medium of claim 19, wherein:
each weight comprises a term frequency inverse document frequency calculation.

* * * * *